(12) United States Patent
Shibuya et al.

(10) Patent No.: US 7,749,659 B2
(45) Date of Patent: Jul. 6, 2010

(54) NONAQUEOUS ELECTROLYTE BATTERY

(75) Inventors: Mashio Shibuya, Fukushima (JP);
Kenichi Kawase, Kanagawa (JP);
Fumiko Hara, Fukushima (JP); Yusuke Fujishige, Fukushima (JP)

(73) Assignee: Sony Corporation, Tokyo (JP)

( * ) Notice: Subject to any disclaimer, the term of this patent is extended or adjusted under 35 U.S.C. 154(b) by 1431 days.

(21) Appl. No.: 10/474,941

(22) PCT Filed: Feb. 18, 2003

(86) PCT No.: PCT/JP03/01732

§ 371 (c)(1),
(2), (4) Date: Apr. 8, 2004

(87) PCT Pub. No.: WO03/073537

PCT Pub. Date: Sep. 4, 2003

(65) Prior Publication Data

US 2004/0170898 A1    Sep. 2, 2004

(30) Foreign Application Priority Data

Feb. 26, 2002  (JP) .............................. 2002-050216
May 13, 2002  (JP) .............................. 2002-137775

(51) Int. Cl.
*H01M 4/58*    (2010.01)
*H01M 4/02*    (2006.01)
*H01M 10/40*   (2006.01)

(52) U.S. Cl. .................. 429/231.8; 429/303; 429/316; 429/324

(58) Field of Classification Search ............... None
See application file for complete search history.

(56) References Cited

U.S. PATENT DOCUMENTS 5,273,842  A  * 12/1993  Yamahira et al. ............. 429/94
6,509,123  B1 *  1/2003  Shibuya et al. ............. 429/303

(Continued)

FOREIGN PATENT DOCUMENTS

JP          05-036413       2/1993

(Continued)

OTHER PUBLICATIONS

International Search Report Jun. 24, 2003.

(Continued)

*Primary Examiner*—John S Maples
(74) *Attorney, Agent, or Firm*—Rader, Fishman & Grauer PLLC

(57) ABSTRACT

The present invention uses a mixture of spherical carbonaceous materials having different average particle sizes as an anode active material in an anode composite mixture layer of an anode. The spherical carbonaceous material of large particle size decreases the reaction with non-aqueous electrolyte solution to suppress the decrease in battery capacity, form clearances having suitable sizes in the anode composite mixture layer, and retain the non-aqueous electrolyte solution. The clearances in the anode composite mixture layer are efficiently filled with the carbonaceous material of small particle size while spaces capable of suitably retaining the non-aqueous electrolyte solution are left unfilled. Thus, the volume density of the anode composite mixture layer is improved and the battery capacity is increased. Accordingly, energy density can be increased without deteriorating battery characteristics.

3 Claims, 11 Drawing Sheets

U.S. PATENT DOCUMENTS 6,670,075 B2 * 12/2003 Morigaki et al. ............. 429/217
6,815,124 B2 * 11/2004 Suzuki et al. ............... 429/303

FOREIGN PATENT DOCUMENTS

| JP | 05-36413 A1 | 2/1993 |
| JP | 06-236755 | 8/1994 |
| JP | 06-236755 A1 | 8/1994 |
| JP | 07-037618 | 2/1995 |
| JP | 07-37618 A1 | 2/1995 |
| JP | 07-134988 A1 | 5/1995 |
| JP | 08-083602 | 3/1996 |
| JP | 08-83602 A1 | 3/1996 |
| JP | 08-162096 | 6/1996 |
| JP | 08-162096 A1 | 6/1996 |
| JP | 08-180864 | 7/1996 |
| JP | 08-180864 A1 | 7/1996 |
| JP | 08-337411 A1 | 12/1996 |
| JP | 09-027314 | 1/1997 |
| JP | 09-27314 A1 | 1/1997 |
| JP | 11-003706 | 6/1999 |
| JP | 11-260410 | 9/1999 |
| JP | 11-307082 A1 | 11/1999 |
| JP | 2001-266941 | 9/2001 |

OTHER PUBLICATIONS

Japanese Office Action dated Dec. 18, 2007 for corresponding Japanese Application No. 2002-137775.

Japanese Office Action dated Aug. 14, 2007 for corresponding Japanese Application No. 2002-137775.

\* cited by examiner

NONAQUEOUS ELECTROLYTE BATTERY

TECHNICAL FIELD

The present invention relates to a non-aqueous electrolyte battery, and more particularly to a non-aqueous electrolyte battery comprising a cathode, an anode and a non-aqueous electrolyte, and the battery characteristics of which are extremely improved.

This application claims a priority based on Japanese Application No. 2002-050216 filed on Feb. 26, 2002 and Japanese Patent Application No. 2002-137775 filed on May 13, 2002, and these applications are applied to this application by referring to them.

BACKGROUND ART

Secondary batteries that are light and have high energy densities have been hitherto progressively developed as power sources of portable electronic devices such as note book type portable computers, portable telephones, video cameras with VTRs (video tape recorders), etc. As secondary batteries having high energy densities, lithium-ion secondary batteries have been developed which use lithium, lithium alloys or materials capable of being doped with/dedoped from lithium ions as anode active materials, and metal oxides or metal sulfides as cathode active materials. In lithium-ion secondary batteries, carbonaceous materials are used for electrochemical, physical and mechanical reasons, and reasons of battery performances, cost, safety, etc.

As for the carbonaceous materials, non-graphitizable carbons having amorphous structures or graphite are used. The graphite includes natural graphite and artificial graphite. The artificial graphite includes spherical graphite, massive graphite, fibrous graphite, etc. When the natural graphite is employed as the anode active material of the lithium-ion secondary battery, the natural graphite can increase a battery capacity. However, the natural graphite is disadvantageously low in its other battery characteristics and hardly treated upon manufacturing a battery. On the other hand, the artificial graphite is easily treated upon manufacturing a battery and large in lithium storage per unit mass or unit volume. Accordingly, the artificial graphite is excellent as the anode active material of the lithium-ion secondary battery.

The spherical graphite among the artificial graphite is called, for instance, a mesophase graphite. Pitch or the like is heated to form a spherulite, what is called a mesophase and an unnecessary part of the mesophase is dissolved by a solvent, heated and graphitized to obtain the spherical graphite. The spherical graphite is also called MCMB, an acronym for mesophase carbon microbeads. The spherical graphite is produced by a method in which, for instance, the spherulite is allowed to grow large and crystallize, then the crystallized product is heated and pulverized, as well as the above-described method.

The above-described artificial graphite exhibits excellent battery characteristics when artificial graphite is used as an anode of the lithium-ion battery. However, the artificial graphite has a problem that a lithium storage per unit mass or unit volume is lower than that of natural graphite.

Further, with spherical graphite, the volume density of the anode is decreased due to spaces generated when two or more spherical bodies are allowed to come into contact with each other, so that a battery capacity is hardly increased.

As a means for improving the volume density of the anode, there is a method in which the range of small particle size in the particle size distribution of the artificial graphite is widened to increase the amount of fine powder. Thus, the fine powder increases the volume density of the anode. Specifically, a method for containing fine particles of 0.3 µm or smaller in an anode active material is proposed in, for instance, Japanese Patent Application Laid-Open No. hei 11-3706. In this case, when the spherical graphite having the fine powder increased is used for the anode, the spherical graphite is high in its reactivity with electrolyte solution and high in its activity because the spherical graphite has a large surface area relative to the volume of the anode. Thus, the battery safety is disadvantageously deteriorated. Although the fine powder is high in its reactivity with the electrolyte solution, a battery capacity is low. Further, when the spaces are excessively filled with the fine powder in the anode, it is feared that there is no space for retaining the electrolyte solution in the anode, and the resistance of the anode side becomes high which deteriorate the battery characteristics. That is, the addition particles that are too small is not preferable for the battery.

DISCLOSURE OF THE INVENTION

It is an object of the present invention to provide a new non-aqueous electrolyte battery capable of eliminating the problems of the batteries conventionally proposed as described above.

It is another object of the present invention to provide a non-aqueous electrolyte battery with increased energy density without deteriorated battery characteristics.

To achieve these objects, the inventors of the present invention eagerly studied, and as a result found that the energy density could be increased without deteriorating the battery characteristics by using a mixture of a plurality of kinds of carbonaceous materials whose particle size distribution areas were controlled and whose average particle sizes were different as an anode active material of an anode in the non-aqueous electrolyte battery.

That is, a non-aqueous electrolyte battery according to the present invention comprises: a cathode having a cathode active material containing lithium; an anode having an anode active material capable of being doped with/dedoped from lithium; and a non-aqueous electrolyte including electrolyte salt. The anode active material is composed of a mixture of a plurality of kinds of carbonaceous materials having different average particle sizes, and when the plurality of kinds of carbonaceous materials are arranged in order of small particle size, assuming that the particle size in the order of 10% from the side of a small particle size is D10, the particle size in the order of 50% from the side of a small particle size is D50, and the particle size in the order of 90% from the side of a small particle size is D90, the anode active material has a particle size distribution satisfying relations represented by following expressions 1 and 2.

$$\log(D50) - \log(D10) \leq 0.3 \quad (1)$$

(The unit of D is µm and logarithms are respectively common logarithms having their bases of 10.)

$$\log(D90) - \log(D50) \leq 0.3 \quad (2)$$

(The unit of D is µm and logarithms are respectively common logarithms having their bases of 10.)

In this non-aqueous electrolyte battery, the anode active material is composed of a mixture of a plurality of kinds of carbonaceous materials having different average particle sizes and the particle size distribution areas of the plurality of kinds of carbonaceous materials are narrowed as shown in the above-described expressions 1 and 2. In this non-aqueous electrolyte battery, the particle size distribution of the anode active material is narrow, and unevenness in performance can be reduced, depending on the particle size of the anode active materials.

In this non-aqueous electrolyte battery, since the carbonaceous material with a large particle size, among the plurality of kinds of carbonaceous materials having different average particle sizes in the anode active material, has a small surface area relative to volume, the carbonaceous material decreases its reactivity with the non-aqueous electrolyte to suppress the decrease of the battery capacity.

Further, in this non-aqueous electrolyte battery, the carbonaceous material of the large particle size forms clearances with suitable sizes in the anode to retain the non-aqueous electrolyte.

In the non-aqueous electrolyte battery, the clearances generated due to the contact of two or more carbonaceous materials of the large particle size are efficiently filled with the carbonaceous material of small particle sizes among the plurality of kinds of carbonaceous materials having the different average particle sizes in the anode active materials while the carbonaceous material with the small particle size leaves in the clearances spaces in which a suitable amount of non-aqueous electrolyte can be retained.

In this non-aqueous electrolyte battery, the carbonaceous material of the small particle size has a large surface area relative to volume which increases its reactivity. Since the amount used of the carbonaceous material of the small particle size is such an amount as to fill the clearances therewith, the volume density of the anode is improved to increase the battery capacity as a whole of the anode.

Further, a non-aqueous electrolyte battery according to the present invention comprises: a cathode having a cathode active material containing lithium; an anode having an anode active material capable of being doped with/dedoped from lithium; and a non-aqueous electrolyte including electrolyte salt. The anode active material is composed of a mixture at least including graphite of large particle size whose average particle size is located within a range of 20 μm or larger and 40 μm or smaller and graphite of small particle size whose average particle size is located within a range of 5 μm or larger and 16 μm or smaller. The average particle size of the graphite of small particle size is 0.55 times the average particle size of the graphite of large particle size, or smaller.

In this non-aqueous electrolyte battery, the anode active material is composed of a mixture of a plurality of kinds of graphite having different average particle sizes such as graphite of large particle size whose average particle size is located within a range of 20 μm or larger and 40 μm or smaller and graphite of small particle size whose average particle size is located within a range of 5 μm or larger and 16 μm or smaller. The average particle size of the graphite of small particle size is 0.55 times the average particle size of the graphite of large particle size, or smaller.

Accordingly, in this non-aqueous electrolyte battery, the anode active material is composed of a mixture of a plurality of kinds of graphite whose average particle sizes are located within prescribed ranges. Further, the surface area of the graphite of large particle size relative to the volume of the anode is decreased, which decreases its reaction with the non-aqueous electrolyte. Thus, the decrease in the capacity of a battery is suppressed.

In the non-aqueous electrolyte battery, the graphite of large particle size in the anode active material forms clearances of suitable size in the anode to retain the non-aqueous electrolyte. Accordingly, the ionic resistance to the non-aqueous electrolyte in the anode side is lowered to prevent the deterioration of the battery characteristics.

Further, in the non-aqueous electrolyte battery, when the graphite of large particle size in the anode active material is spherical graphite, the spherical graphite of large particle size increases its volume relative to a surface area. Thus, the central part, which is called the bulk part, except the surfaces on which crystallization is advanced, is larger than that of the graphite of small particle size so that the lithium storage can be increased to increase the capacity of the battery.

On the other hand, in the non-aqueous electrolyte battery, the clearances in the anode are efficiently filled with the graphite of small particle size in the anode active material while leaving spaces capable of retaining a suitable amount of non-aqueous electrolyte. Therefore, the volume density of the anode can be improved and the capacity of the battery can be increased to improve energy density.

Still other objects of the present invention and specific advantages obtained by the present invention will become more apparent from the explanation of the following embodiments described below.

BEST MODE FOR CARRYING OUT THE INVENTION

Figure 1:
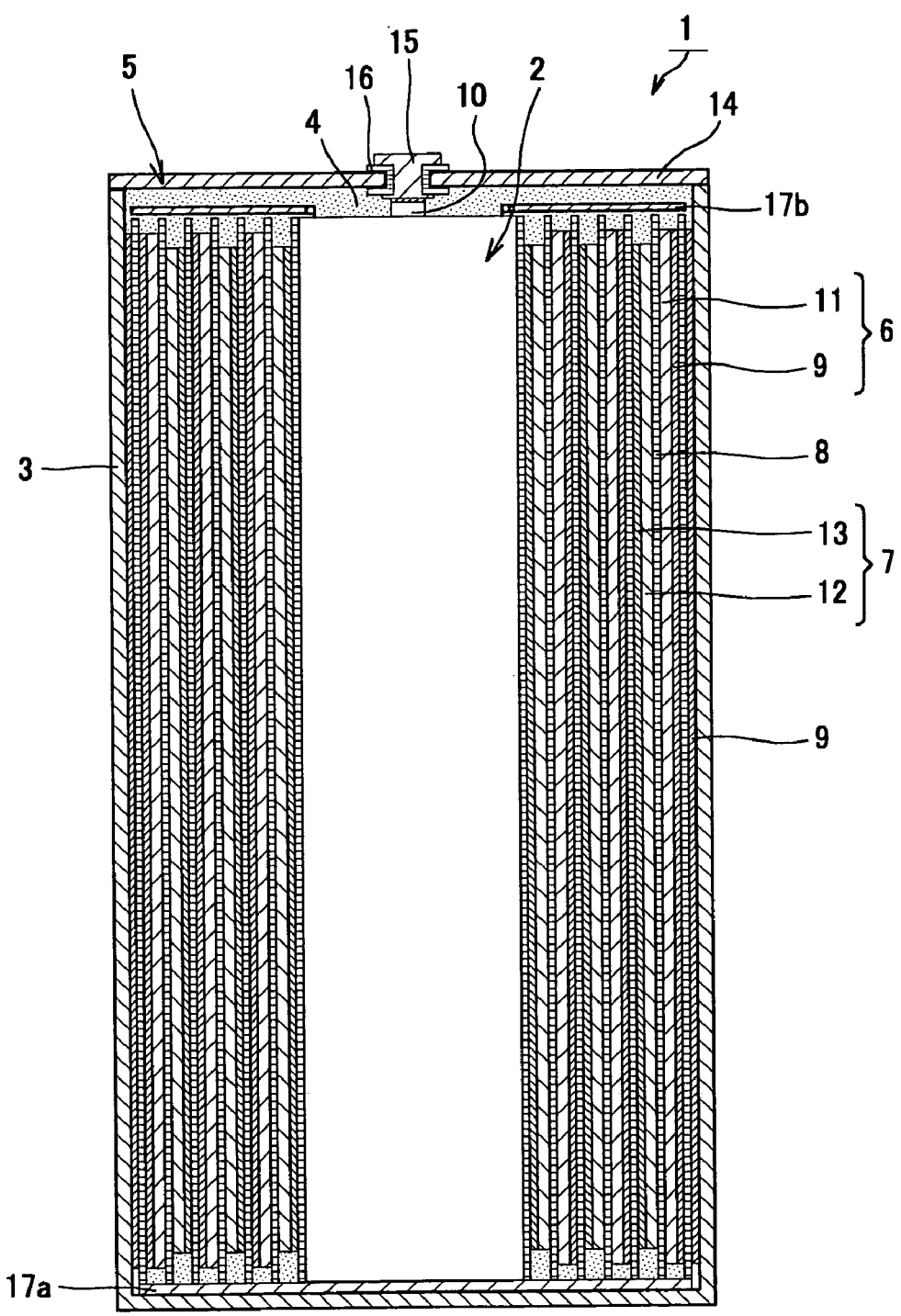
FIG. 1 is a sectional view showing the inner structure of a lithium-ion secondary battery according to the present invention.

Now, a non-aqueous electrolyte battery to which the present invention is applied will be described below. As a non-aqueous electrolyte battery, one structural example of a lithium-ion secondary battery (referred to hereinafter as a battery) is shown in FIG. 1. In FIG. 1, the battery 1 includes a battery element 2 serving as a power generating element, an outer package can 3 for accommodating the battery element 2, non-aqueous electrolyte solution 4, and a sealing cover body 5.

The battery element 2 has a structure in which an elongated anode 6 and an elongated cathode 7 are spirally coiled in a flat shape with an elongated separator 8 interposed between the anode and the cathode. An anode current collector 9 of the anode 6 is exposed in an outermost periphery. In the battery element 2, the anode current collector 9 is exposed in the outermost periphery so that the anode current collector 9 comes into electrical contact with the battery can 3. Accordingly, to simplify the manufacture of the battery, a terminal, a lead, or the like, for collecting electric current, does not need to be attached to the anode 6. On the other hand, in the battery element 2, a cathode terminal 10, electrically connected to the sealing cover body 5, is attached to the cathode 7. The cathode terminal 10 protrudes from one end face in the direction of width of the separator 8.

The anode 6 has a structure in which an anode composite mixture, including an anode active material and a binding agent, is applied to the anode current collector 9, dried, and pressed to form an anode composite mixture layer 11 on the anode current collector 9.

Figure 2:
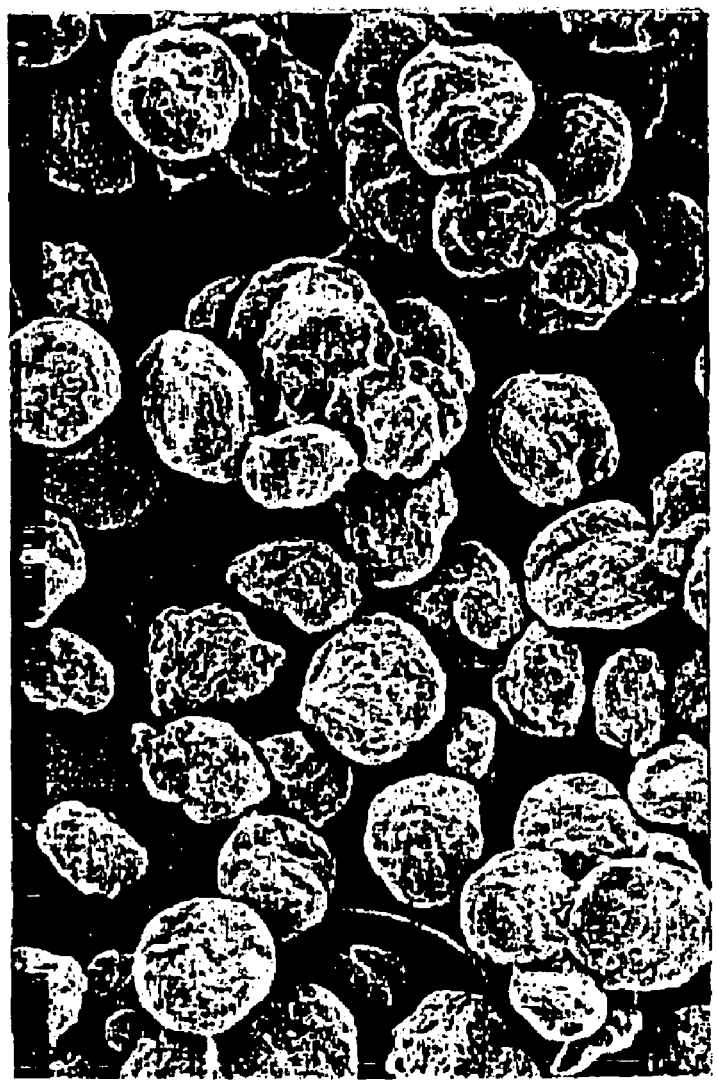
FIG. 2 is a photograph substituted for a drawing showing enlarged MCMBs as anode active materials used in the lithium-ion secondary battery according to the present invention.

As the anode active material, for instance, artificial graphite, especially, MCMB (mesophase carbon microbeads), or the like, is employed. FIG. 2 shows a microphotograph of the MCMB in an enlarged state.

Then, the MCMB as the artificial graphite is manufactured in the following manner. When the MCMB is produced as the artificial graphite, for instance, coal tar, petroleum pitch, coal pitch, coal tar pitch, mesophase pitch obtained by polymerizing polycyclic aromatic hydrocarbon, and distilled pitch, such as a mixture of condensed polycyclic aromatic hydrocarbon obtained by distilling coal tar, are first used as starting materials, and one or a plurality of these starting materials are heated at 400° C. to 500° C. In accordance with this process, the hexagonal ring of carbon is developed in the liquid of the starting materials to produce a spherical body having regularity in the arrangement of carbon atoms such as a crystal, that is, a mesophase.

Then, the starting materials including the mesophase are processed by a solvent such as tar middle oil. Thus, the mesophase is not dissolved in the solvent because the mesophase is progressively crystallized, and only parts in which crystallization is not advanced are dissolved in the solvent and removed. Accordingly, small spherical bodies are obtained. In the mesophase, small spherical bodies, obtained as described above, and particle size or particle size distribution can be controlled by adjusting the temperature of a heating process, time, or the like.

Then, the mesophase small spherical bodies are temporarily burnt at 400° C. to 1200° C., and then, graphitized at 2500° C. to 3200° C. in vacuum or an inert gas atmosphere. In such a way, the MCMBs of artificial graphite are produced.

In the MCMBs produced in such a manner, crystallization is entirely advanced as graphite, however, the degree of crystallization on a surface part is low. In the MCMBs, the surface part, that is, the part in which the degree of crystallization is low has a small amount of lithium storage. However, this part is low in its reactivity with the non-aqueous electrolyte solution 4, so that a side reaction which causes the capacity of a battery to be decreased more than the part in which the degree of crystallization is high is hardly generated. On the other hand, in the inner part except the surface, what is called the bulk part, since crystallization is advanced and the degree of crystallization becomes high, the amount of lithium storage is increased so that the capacity of the battery can be improved.

Figure 3:
FIG. 3 is a photograph substituted for a drawing showing, as an anode active material, crushed artificial graphite in an enlarged state obtained from a bulk mesophase before a spherical process is applied thereto.
Figure 4:
FIG. 4 is a photograph substituted for a drawing showing, as an anode active material, flake natural graphite in an enlarged state to which the spherical process is applied to form spherical particles.

As the anode active material, spherical carbonaceous materials may be used as well as the MCMBs obtained as described above. Specifically, for instance, crushed artificial graphite obtained from bulk mesophase or the like, flake natural graphite, hard carbon such as non-graphitizable carbon as non-graphite, etc. may be exemplified. These materials are processed to be spherical and spherical particles are used. Here, FIG. 3 shows a microphotograph in which crushed artificial graphite, obtained from bulk mesophase or the like, is enlarged. FIG. 4 shows a microphotograph in which flake natural graphite, formed in spherical particles under a process for making the spherical particles, is enlarged.

The spherical carbonaceous materials are different from the MCMBs. Most of the spherical materials usually have no difference in materiality between their surfaces and inner parts. However, for instance, a surface treatment is applied to the surfaces of the spherical carbonaceous materials so that the surfaces are amorphous. Thus, the materiality of the surfaces can be controlled. In the spherical carbonaceous materials, the filling characteristic of the anode composite mixture layer 11 can be improved due to spherical forms. Further, in the spherical carbonaceous materials, since the surface treatment is performed so that the surfaces are amorphous, the reaction with the non-aqueous electrolyte solution 4 on the surfaces can be suppressed.

Then, when the spherical carbonaceous materials to which the above-described spherical process or the surface treatment is applied are used as the anode active material, the mixture of a plurality of kinds of spherical carbonaceous materials different in their average particle size is employed where the plurality of spherical carbonaceous materials have a particle size distribution satisfying the relationship represented by below-described expressions 3 and 4. For both expressions 3 and 4, D10, D50, and D90 represent components of a particle size distribution, which can be measured by, for example, using a laser diffraction method. Within the particle size distribution, D10 represents a particle size such that 10% of the particles in the carbonaceous material mixture are smaller than D10, D50 represents a particle size such that 50% of the particles in the carbonaceous material mixture are smaller than D50, and D90 represents a particle size such that 90% of the particles in the carbonaceous material mixture are smaller than D90.

$$\log(D50) - \log(D10) \leq 0.3 \tag{3}$$

(The unit of D is μm and logarithms are respectively common logarithms having their bases of 10.)

$$\log(D90) - \log(D50) \leq 0.3 \tag{4}$$

(The unit of D is μm and logarithms are respectively common logarithms having their bases of 10.)

Thus, in the anode active material, the spherical carbonaceous materials of large particle size of the spherical carbonaceous materials having different average particle sizes have a surface area relatively smaller than that of the spherical carbonaceous materials of small particle size. Accordingly, the spherical carbonaceous materials of large particle size decrease a reaction with the non-aqueous electrolyte solution 4 to suppress the decrease of the capacity of a battery. Further, the spherical carbonaceous materials of large particle size have large volume relative to surface area. Therefore, the central part, except the surface in which crystallization is advanced, what is called a bulk part has a volume larger than that of the spherical carbonaceous materials of small particle size to increase the capacity of the battery. Further, the spherical carbonaceous materials of large particle size form clearances of suitable size in the anode composite mixture layer 11 so as to retain the non-aqueous electrolyte solution 4. On the other hand, the clearances in the anode composite mixture layer 11 are efficiently filled with the spherical carbonaceous materials of small particle size of the spherical carbonaceous materials having different average particle sizes. At this time, the spherical carbonaceous materials of small particle size leave spaces in which suitable amount of non-aqueous electrolyte solution 4 can be retained.

Accordingly, in the anode active material, the mixture of a plurality of kinds of spherical carbonaceous materials whose particle size distribution areas are controlled to be narrow and whose average particle sizes are different is used. Thus, the clearances that the electrolyte in a composite mixture application film of the anode 6 enters are made optimum so that desired electrolyte is retained without lowering volume density. Further, the high ionic conductivity of the electrolyte in the anode composite mixture application film is ensured to prevent the deterioration of battery characteristics and the volume density of the anode composite mixture layer 11, that is, filling density is improved to increase the capacity of the battery.

In the anode active material, the spherical carbonaceous material can be divided into the surface part in which crystalline characteristics are low like the MCMB and the bulk part except the surface part in which crystalline characteristics are high by performing the above-described surface treatment or the like. In the above-described spherical carbonaceous material, the surface part in which the crystalline characteristics are low decreases a capacity in view of battery characteristics, what is called an amount of lithium storage, however, decreases a reactivity with the non-aqueous electrolyte solution 4. On the other hand, the bulk part in which the crystalline characteristics are high increases a reactivity with the non-aqueous electrolyte solution 4, however, increases an amount of lithium storage. That is, in the spherical carbonaceous material, the bulk part substantially occupies most of the volume and has the high crystalline characteristics, so that the bulk part has the large amount of lithium storage and the high reactivity with the non-aqueous electrolyte solution 4. However, since the crystalline characteristics of the surface that mainly comes into contact with the non-aqueous electrolyte solution 4 are low, a reaction with the non-aqueous electrolyte solution 4 is suppressed.

Further, in the anode active material, when the particle size distribution areas of the spherical carbonaceous material of the large particle size and the spherical carbonaceous material of the small particle size extend, two or more spherical carbonaceous materials of the large particle size come into contact with each other. Thus, clearances of various sizes are formed. In this case, when the clearances are to be filled with the spherical carbonaceous materials of the small particle size, the spherical carbonaceous materials may not enter the clearances, because they are too large. Otherwise, the clearances may be too tightly filled with the spherical carbonaceous materials of the small particle size because they are too small. Fine powder in the spherical carbonaceous materials of the small particle size especially decreases the capacity and especially increases the reactivity with the non-aqueous electrolyte solution 4. Consequently, the capacity of the battery is decreased so that the capacity is seriously decreased and the safety is lowered. Accordingly, in the anode active material, the particle size distribution areas of the spherical carbonaceous materials having different average particle sizes are narrowed, which is important an condition in obtaining good battery characteristics.

Further, when spherical graphite such as the MCMB is used as the anode active material, graphite of large particle size whose average particle size is located within a range of 20 μm or larger and 40 μm or smaller is mixed with graphite of small particle size whose average particle size is located within a range of 5 μm or larger and 16 μm or smaller and the average particle size of the graphite of small particle size is 0.55 times the average particle size of the graphite of large particle size, or smaller. That is, as the anode active material, the mixture of a plurality of kinds of spherical graphite in which the particle size distributions are controlled to be narrow and the average particle sizes are different is employed.

Specifically, the distribution of the graphite of large particle size is set forth by the following expressions 5 and 6, where DL10, DL50, and DL90 represent components of a particle size distribution for the graphite of large particle size. Within the particle size distribution, DL10 represents a graphite particle size such that 10% of the large particle graphite is smaller than DL10, DL50 represents a graphite particle size such that 50% of the large particle graphite is smaller than DL50, and DL90 represents a graphite particle size such that 90% of the large particle graphite is smaller than DL90.

$$\log(DL50)-\log(DL10)\leq 0.22 \quad (5)$$

(The unit of DL is μm and logarithms are respectively common logarithms having their bases of 10.)

$$\log(DL90)-\log(DL50)\leq 0.22 \quad (6)$$

(The unit of DL is μm and logarithms are respectively common logarithms having their bases of 10.)

Thus, the graphite of large particle size of the spherical graphite having different average particle sizes has its surface area relatively smaller than that of the graphite of small particle size so that the graphite of large particle size decreases a reaction with the non-aqueous electrolyte solution 4 and suppresses the decrease of the capacity of the battery. Further, since the graphite of large particle size has a large volume relative to a surface area, a bulk part has a large volume relative to the graphite of small particle size to increase the capacity of a battery. Further, the graphite of large particle size forms clearances of appropriate size in the anode composite mixture layer 11 to retain the non-aqueous electrolyte solution 4 therein.

On the other hand, the distribution of for the graphite of small particle size is set forth by the following expressions 7 and 8, where DS10, DS50, and DS90 represent components of a particle size distribution for the graphite of small particle size. Within this particle size distribution, DS10 represents a graphite particle size such that 10% of the small particle graphite is smaller than DS10, DS50 represents a graphite particle size such that 50% of the small particle graphite is smaller than DS50, and DS90 represents a graphite particle size such that 90% of the small particle graphite is smaller than DS90.

$$\log(DS50) - \log(DS10) \leq 0.22 \quad (7)$$

(The unit of DS is μm and logarithms are respectively common logarithms having their bases of 10.)

$$\log(DS90) - \log(DS50) \leq 0.22 \quad (8)$$

(The unit of DS is μm and logarithms are respectively common logarithms having their bases of 10.)

Thus, the clearances in the anode composite mixture layer 11 are efficiently filled with graphite of small particle size of the spherical graphite having different average particle sizes while spaces are left unfilled in which a suitable amount of the non-aqueous electrolyte solution 4 can be retained.

Accordingly, in the anode active material, the mixture of a plurality of kinds of spherical graphite, whose particle size distribution areas are controlled to be narrow and whose average particle sizes are different, is used. Thus, ionic resistance to the non-aqueous electrolyte solution 4 in the anode 6 side is lowered to prevent the deterioration of battery characteristics, and the volume density of the anode composite mixture layer 11, that is, filling density is improved to increase the capacity of the battery.

In the anode active material, the spherical graphite, especially, the MCMB can be divided into the surface part in which crystalline characteristics are low and the bulk part except the surface part in which crystalline characteristics are high, as described above. In the MCMB, the surface part in which the crystalline characteristics are low decreases an amount of lithium storage, however, decreases a reactivity with the non-aqueous electrolyte solution 4. On the other hand, the bulk part in which the crystalline characteristics are high increases a reactivity with the non-aqueous electrolyte solution 4, however, increases an amount of lithium storage. That is, also in the spherical graphite, the bulk part substantially occupies most of the volume and has the high crystalline characteristics so that the bulk part has the large amount of lithium storage and the high reactivity with the non-aqueous electrolyte solution 4. However, since the crystalline characteristics of the surface that mainly comes into contact with the non-aqueous electrolyte solution 4 are low, a reaction with the non-aqueous electrolyte solution 4 is suppressed.

Further, in the anode active material, when the particle size distribution areas of the spherical graphite of the large particle size and the spherical graphite of the small particle size extend, two or more spherical graphite of the large particle size come into contact with each other. Thus, clearances of various sizes are formed. In this case, when the clearances are to be filled with the spherical graphite of the small particle size, the spherical graphite may not enter the clearances because they are too large. Otherwise, the clearances may be too tightly filled with the spherical graphite of the small particle size because they are too small. Fine powder in the spherical graphite of the small particle size especially decreases a capacity and especially increases the reactivity with the non-aqueous electrolyte solution 4. Consequently, the capacity of the battery is decreased so that the capacity is seriously decreased and the safety is lowered. Accordingly, in the anode active material, the particle size distribution areas of the spherical graphite having different average particle sizes are narrowed, which is important condition in obtaining good battery characteristics.

In the anode active material, when the average particle size of the graphite of large particle size is smaller than 20 μm, the particle size of the graphite of large particle size is too small and substantially has no difference from the range of the average particle size of the graphite of small particle size. Consequently, the anode composite mixture layer 11 is filled with the spherical graphite without clearances. Thus, pressure is excessively exerted on the spherical graphite under compression molding when the anode 6 is manufactured so that the surfaces of the particles of the spherical graphite are broken to deteriorate the battery characteristics. Further, since the surface area is relatively increased, reactivity with the electrolyte is increased to decrease the capacity of the battery. On the other hand, in the anode active material, when the average particle size of the graphite of large particle size is larger than 40 μm, the particle size is too large. Thus, the volume density of the anode composite mixture layer 11 is hardly improved under compression molding when the anode 6 is manufactured. Since cracks are generated in the particles due to the compression molding, the battery characteristics are deteriorated.

Accordingly, in the anode active material, the average particle size of the graphite of large particle size is located within a range of 20 μm or larger and 40 μm or smaller. Thus, the particles do not crack under the compression molding or the like upon manufacturing the anode 6 and the deterioration of the battery characteristics is suppressed.

In the anode active material, when the average particle size of the graphite of small particle size is smaller than 5 μm, the particle size of the graphite of small particle size is too small. Thus, not only the clearances in the anode composite mixture layer 11, but also the spaces in which the non-aqueous electrolyte solution 4 is retained are filled with the graphite of small particle size to decrease an electric contact between the anode 6 and the non-aqueous electrolyte solution 4. Accordingly, the battery characteristics are deteriorated. In this case, since the surface area of the spherical graphite is too large so as to increases the reactivity with the non-aqueous electrolyte solution 4, the safety of the battery is deteriorated. On the other hand, in the anode active material, when the average particle size of the graphite of small particle size is larger than 16 μm, the particle size of graphite of small particle size is too large. The particle size of the graphite of small particle size substantially has no difference from the range of the average particle size of the graphite of large particle size. Accordingly, clearances in the composite mixture layer 11 that are formed by allowing two or more graphite of large particle size to come into contact with each other are hardly efficiently filled with the graphite of small particle size. Thus, the volume density of the anode composite mixture layer 11 is decreased and energy density can not be improved.

Accordingly, in the anode active material, the average particle size of the graphite of small particle size is located within a range of 5 μm or larger and 16 μm or smaller. Thus, the clearances in the anode composite mixture layer 11 are efficiently filled with the graphite of small particle size, while spaces in which a suitable amount of non-aqueous electrolyte solution 4 can be retained are left unfilled. Thus, the energy density is improved.

Further, in the anode active material, when the average particle size of the graphite of small particle size is larger than 0.55 times the average particle size of the graphite of large particle size or smaller, there is no difference in average particle size between the graphite of large particle size and the graphite of small particle size. Further, the clearances in the anode composite mixture layer 11 that are produced due to the contact of two or more graphite of large particle size are hardly efficiently filled with the graphite of small particle size. Thus, the volume density of the anode composite mixture layer 11 is reduced. In this case, when the clearances are formed in the anode composite mixture layer 11, the clearances in the anode composite mixture layer 11 become large while charging and discharging operations are repeated. Thus, the contact of the spherical graphite is separate to increase an ionic resistance to the non-aqueous electrolyte solution 4 of the anode 6 side and deteriorate the battery characteristics. Further, when there is no difference in average particle size between the graphite of small particle size and the graphite of large particle size, pressure is excessively exerted on the spherical graphite under compression molding when the anode 6 is produced to crack the spherical graphite. Accordingly, the battery characteristics are deteriorated.

Therefore, in the anode active material, the average particle size of the graphite of small particle size is not larger than 0.55 times the average particle size of the graphite of large particle size, or smaller. Thus, the graphite of small particle size has an appropriate size relative to the graphite of large particle size. Accordingly, the above-described operational effect of the graphite of large particle size and the operational effect of the graphite of small particle size can be obtained.

Further, in the anode active material, when the spherical graphite is used, the graphite of large particle size is mixed with the graphite of small particle size in the weight ratio ranging from 65:35 to 90:10. For the anode active material, when the mixture of the graphite of large particle size and the graphite of small particle size is used and the graphite of large particle size is mixed in a weight ratio lower than 65% relative to all the spherical graphite, the graphite of small particle size having a larger surface area and a high reactivity with the non-aqueous electrolyte solution 4 is too much, so that the safety is lowered. Further, since the surface area is large and the reactivity with the electrolyte is high, the capacity of the battery is reduced. Further, in this case, since the graphite of small particle size is too much, even the spaces in which the non-aqueous electrolyte solution 4 in the anode composite mixture layer 11 is retained are filled with the graphite of small particle size. Accordingly, an amount of the non-aqueous electrolyte solution 4 with which the anode composite mixture layer 11 is impregnated is decreased. Thus, an ionic resistance to the non-aqueous electrolyte solution 4 of the anode 6 side is increased to deteriorate the battery characteristics. On the other hand, when the mixture of graphite of large particle size and graphite of small particle size is used as the anode active material and the graphite of large particle size is mixed in a weight ratio higher than 90% relative to all the spherical graphite, the amount of the graphite of small particle size is too small. Consequently, the clearances in the anode composite mixture layer 11 cannot be efficiently filled with the graphite of small particle size. Thus, the volume density of the anode composite mixture layer 11 is hardly increased to increase the capacity of the battery.

In the anode 6, as a binding agent of the anode composite mixture layer 11, binding agents such as polyvinylidene fluoride or styrene butadiene rubber, used as an anode composite mixture of a non-aqueous electrolyte battery, may be used. In addition, a well-known additive agent or the like may be added to the anode composite mixture layer 11. In the anode 6, as the anode current collector 9, a foil type metal made of, for instance, copper or a net shaped metal or the like is employed.

The cathode 7 has a structure such that a cathode composite mixture layer 13 is formed on a cathode current collector 12 by applying, drying and pressing cathode composite mixture including a cathode active material and a binding agent on the cathode current collector 12. In the cathode 7, the cathode terminal 10 is connected to a prescribed position of the cathode current collector 12 so as to protrude in the direction of width of the cathode current collector 12. As the cathode terminal 10, an elongated metal piece made of, for instance, aluminum is used.

As the cathode active material, lithium composite oxide, represented by $LiM_xO_2$, (where, M indicates one or more kinds of transition metals including Co, Ni, Mn, Fe, Al, V, Ti, etc., x depends on the charging and discharging states of a battery and is ordinarily greater than or equal to 0.05 or less than or equal to 1.10, or the like is employed. As the transition metals M forming the lithium composite oxide, Co, Ni, Mn or the like is preferable. As specific examples of the lithium composite oxide, $LiCoO_2$, $LiNiO_2$, $LiNi_yCo_{1-y}O_2$ (where the range of y is represented by $0<y<1$.), $LiMn_2O_4$, etc. may be exemplified. Further, as the cathode active materials, compounds represented by, for instance, $Li_xFe_{1-y}M_yPO_4$ (where M indicates any one or more kinds of Mn, Cr, Co, Cu, Ni, V, Mo, Ti, Zn, Al, Ga, Mg, B and Nb, x is located within a range represented by $0.05 \leq x \leq 1.2$, and y is located within a range represented by $0 \leq y \leq 0.8$) may be exemplified. Specifically, $LiFePO_4$ or the like is employed. As the cathode active material, for instance, metal sulfides or oxides such as $TiS_2$, $MoS_2$, $NbSe_2$, $V_2O_5$, etc. may be employed.

In the cathode 7, as the binding agent of the cathode composite mixture layer 13, binding agents such as polyvinylidene fluoride, tetrafluoroethylene, etc. used in a cathode composite mixture of a non-aqueous electrolyte battery can be used. In addition, for instance, a carbonaceous material may be added to the cathode composite mixture layer 13 as a conductive material, or a well-known additive agent or the like may be added thereto. In the cathode 7, as the cathode current collector 12, for instance, foil type metal or net type metal made of aluminum is used.

In the battery element 2, the separator 8 serves to separate the anode 6 from the cathode 7 and a well-known material ordinarily used as an insulating porous film of this kind of non-aqueous electrolyte battery may be used. Specifically, a polymer film such as polypropylene, polyethylene, etc, is used. Further, the separator 8 is preferably thin as much as possible from the viewpoint of the relation between lithium ion conductivity and energy density. The separator, with the thickness of 30 μm or smaller, is used.

The outer package can 3 is a tubular vessel having, for instance, a rectangular or a flat circular bottom surface and has such a dimension so as to insert the battery element 2 in a direction substantially parallel to the direction of width of the separator 8. When the outer package can 3 is electrically connected to the anode current collector 9 of the anode 6 due to contact, the outer package can 3 is made of, for instance, iron, stainless steel, nickel, etc. When the outer package can 3 is electrically connected to the cathode current collector 12 of the cathode 7, the can is made of aluminum. When the outer package can 3 is made of, for instance, iron, the surface thereof is plated with nickel.

The non-aqueous electrolyte solution 4 is prepared by dissolving electrolyte salt in a non-aqueous solvent. As the non-aqueous solvent, a solvent having a relatively high dielectric constant is used. Specifically, cyclic carbonates such as propylene carbonate, ethylene carbonate, etc., chain carbonates such as diethyl carbonate, dimethyl carbonate, etc., solvents obtained by replacing hydrogens of these carbonates by halogens, carboxylic esters such as methyl propionate, methyl butyrate, etc., ethers such as 2-methyl tetrahydrofuran, dimethoxyethane, butyrolactones such as γ-butyrolactone, valerolactones such as γ-valerolactone, sulfolanes, etc. may be exemplified. Then, a mixture of one or more kinds of these non-aqueous solvents is used.

For instance, when the above-described graphite is employed as the anode active material, ethylene carbonate or ethylene carbonate in which hydrogen atoms are replaced by halogen elements or the like are employed as main solvents of the non-aqueous solvent. To these main solvents, for instance, propylene carbonate, butylene carbonate, 1,2-dimethoxyethane, γ-butyrolactone, valerolactone, tetrahydrofuran, 2-methyl tetrahydrofuran, 1,3-dioxolane, 4-methyl-1,3-dioxolane, sulfolane, methyl sulfolane, etc. are added as a second solvent component within a range less than 10 vol %.

As electrolyte salt used in the non-aqueous solution 4, electrolyte salt ordinarily employed in the electrolyte solution of the non-aqueous electrolyte battery can be used. Specifically, $LiPF_6$, $LiBF_4$, $LiAsF_6$, $LiClO_4$, $LiB(C_6H_5)_4$, $CH_3SO_3Li$, $CF_3SO_3Li$, $LiN(SO_2CF_3)_2$, $LiN(SO_2C_2F_5)_2$, $LiC(SO_2CF_3)_3$, $LiAlCl_4$, $LiSiF_6$, $LiCl$, $LiBr$, etc. may be enumerated. A mixture of one or a plurality of kinds of these electrolyte salts is used. Especially, as the electrolyte, $LiPF_6$ and $LiBF_4$, excellent in oxidation stability, are employed. The concentration of the electrolyte salt relative to the non-aqueous solvent is not especially limited. However, it is set to a range of 0.4 mole/liter or more and 1.5 mole/liter or less. The above-described concentration-range makes it possible to raise the ionic conductivity of the non-aqueous solution 4.

The sealing cover body 5 has a structure that a terminal part 15 is fitted to a substantially central part of a sealing plate material 14 through an insulating gasket 16. The sealing plate material 14 is made of, for instance, iron, stainless steel, nickel, etc. when the outer package can 3 is electrically connected to the anode 6. Especially, when the sealing plate material 14 is formed with iron, the surface of the sealing plate material is plated with nickel. When the cathode terminal 10 is connected to the terminal part 15, the terminal part 15 is made of, for instance, aluminum or the like. For the insulating gasket 16, an insulating resin such as polypropylene is used. The insulating gasket 16 may be formed with a hermetic seal such as glass.

Figure 5:
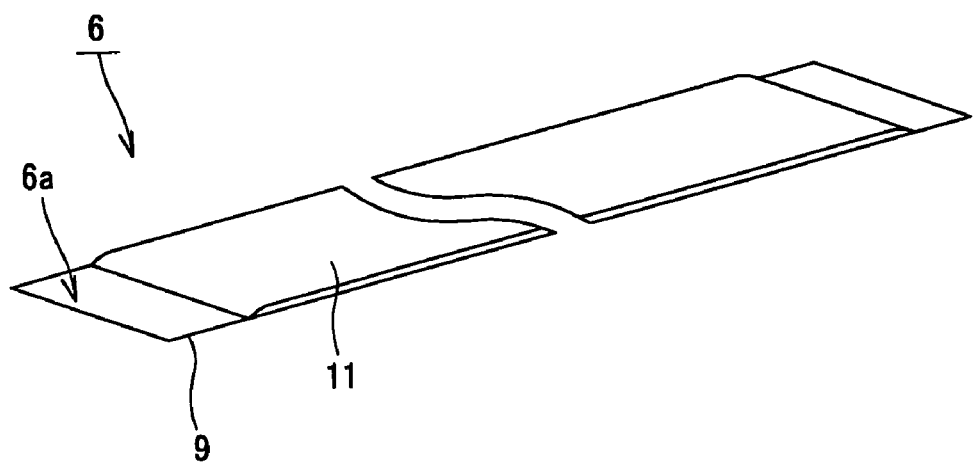
FIG. 5 is an explanatory view for explaining a manufacturing step of the lithium-ion secondary battery according to the present invention and a perspective view showing an anode.

The battery 1 having the above-described structure is manufactured as described below. First, the anode 6 is manufactured. When the anode 6 is manufactured, as shown in FIG. 5, an anode composite mixture, which includes the anode active material composed of a mixture of a plurality of kinds of spherical graphite having different average particle sizes and a binding agent, is prepared. This anode composite mixture is uniformly applied to the anode current collector 9 made of, for instance, a copper foil, so as to provide a part 6*a* to which the anode composite mixture is not applied and dried to form the anode composite mixture layer 11. The anode current collector having the anode composite mixture layer is cut to a prescribed dimension. In such a manner, the elongated anode 6 is manufactured.

Figure 6:
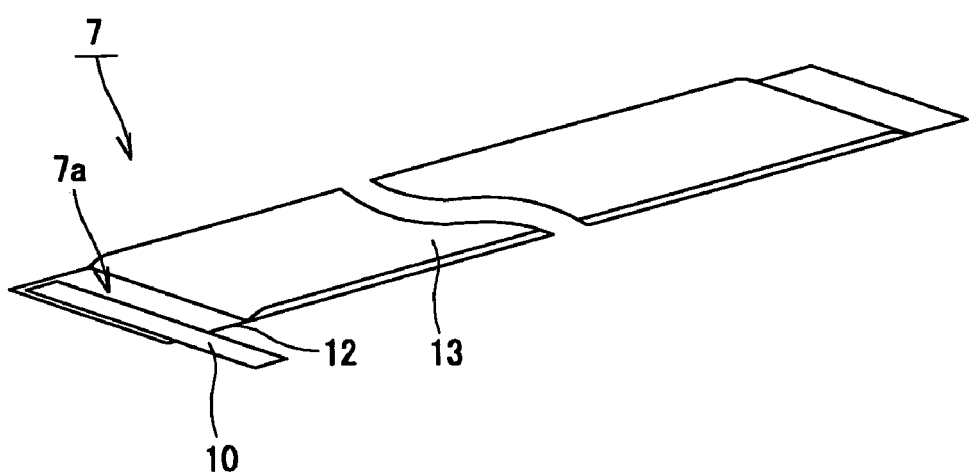
FIG. 6 is an explanatory view for explaining a manufacturing step of the lithium-ion secondary battery according to the present invention and a perspective view showing a cathode.

Then, the cathode 7 is manufactured. When the cathode 7 is manufactured, as shown in FIG. 6, cathode composite mixture, including the cathode active material and a binding agent, is prepared. This cathode composite mixture is uniformly applied and dried on the cathode current collector 12 made of, for instance, aluminum, so as to provide a part 7*a* to which the cathode composite mixture is not applied to form a cathode composite mixture layer 13. The cathode current collector having the cathode composite mixture layer is cut to a prescribed dimension. Then, the cathode terminal 10 is connected to the part 7*a* of the cathode current collector 12 to which the cathode composite mixture is not applied by an ultrasonic welding method or a spot welding method or the like. In such a manner, the elongated cathode 7 is manufactured.

Figure 7:
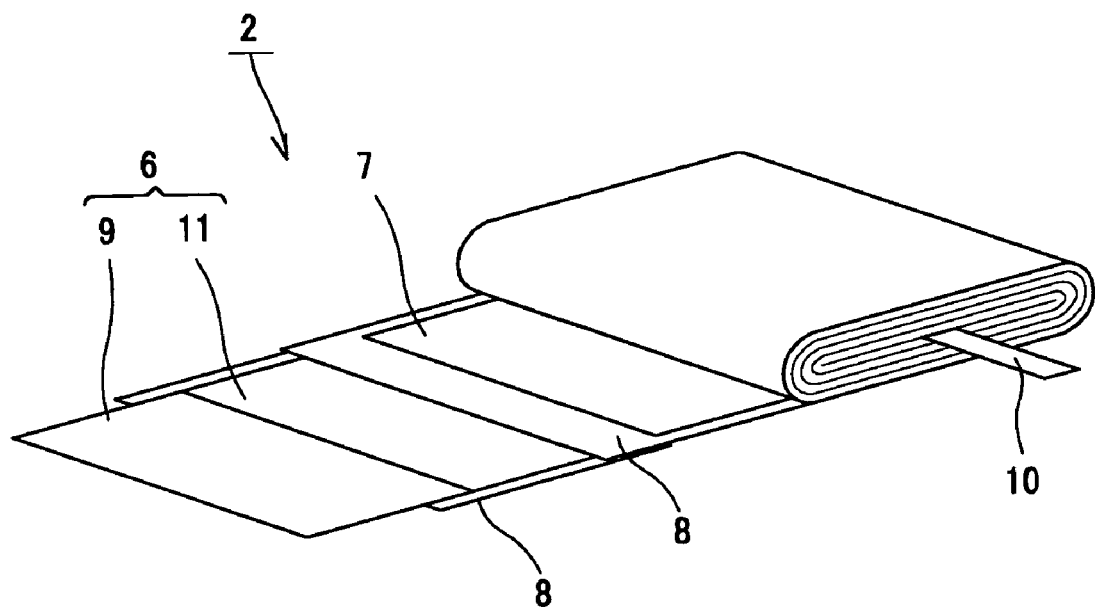
FIG. 7 is an explanatory view for explaining a manufacturing step of the lithium-ion secondary battery according to the present invention and a perspective view showing a battery element.

Subsequently, as shown in FIG. 7, the anode 6 and the cathode 7, obtained as described above, are laminated through the elongated separators 8, and the laminated body is spirally coiled many times in a flat shape to form the battery element 2. At this time, the battery element 2 is spirally coiled in such a way that the anode current collector 9 is exposed in an outermost periphery and the cathode terminal 10 protrudes from one end face in the direction of width of the separator 8.

Figure 8:
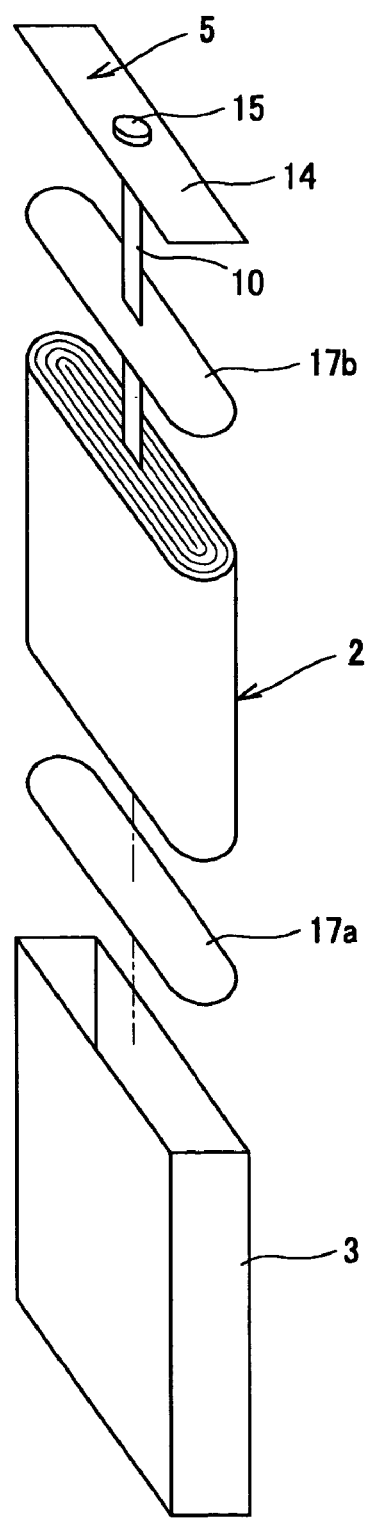
FIG. 8 is an explanatory view for explaining a manufacturing step of the lithium-ion secondary battery according to the present invention and an exploded perspective view showing that the battery element is accommodated in an outer package can.

Then, as shown in FIG. 8, an insulating plate 17*a* is inserted into a bottom part of the thin and rectangular outer package can 3 made of iron and having a surface plated with nickel. Further, while an insulating plate 17*b* is mounted on the end face of the battery element 2 in the side where the cathode terminal 10 protrudes, the battery element 2 is accommodated in the outer package can 3 so that the cathode terminal 10 faces the opening side of the outer package can 3. Then, the end part of the cathode terminal 10 is connected to the terminal part 15 of the sealing cover body 5.

After that, the non-aqueous electrolyte solution 4 is injected into the outer package can 3 in which the battery element 2 is accommodated. Then, the opening edge part of the outer package can 3 and the peripheral edge part of the sealing plate material 14 of the sealing cover body 5 are welded and sealed without spaces by, for instance, a laser welding method. Thus, the outer package can 3 and the sealing plate material 14 are electrically conducted to the anode 6 to serve as an external anode of the battery 1. Further, the terminal part 15 is electrically conducted to the cathode 7 to serve as an external cathode of the battery 1. In this manner, the thin battery 1 is manufactured.

In the battery 1, manufactured as described above, when, for instance, the spherical graphite is used for the anode active material, the mixture composed of a plurality of kinds of spherical graphite having different average particle sizes, whose particle size distribution area is controlled to be narrow as the anode active material is employed. Thus, the spherical graphite having a large particle size among the spherical graphite having different average particle sizes relatively decreases the surface area more than the spherical graphite having a small particle size. Accordingly, a reaction with the non-aqueous electrolyte solution 4 is decreased to suppress the decrease of the capacity of the battery.

Further, in this battery 1, since the spherical graphite having the large particle size increases the volume relative to the surface area, the bulk part becomes large relative to the spherical graphite having the small particle to increase the capacity of the battery.

Further, in this battery 1, the spherical graphite having the large particle size forms clearances of adequate sizes in the anode composite mixture layer 11 to retain the non-aqueous electrolyte solution 4 and decrease an ionic resistance to the non-aqueous electrolyte solution 4 in the anode 6 side. Thus, the deterioration of battery characteristics can be prevented.

Still further, in this battery 1, the clearances in the anode composite mixture layer 11 are efficiently filled with the spherical graphite having the small particle size among the spherical graphite having different average particle sizes while the spherical graphite having the small particle size leaves spaces in which a suitable amount of non-aqueous electrolyte solution 4 can be retained. Accordingly, the volume density of the anode composite mixture layer 11 is enhanced to increase the capacity of the battery and improve energy density.

Figure 9A:
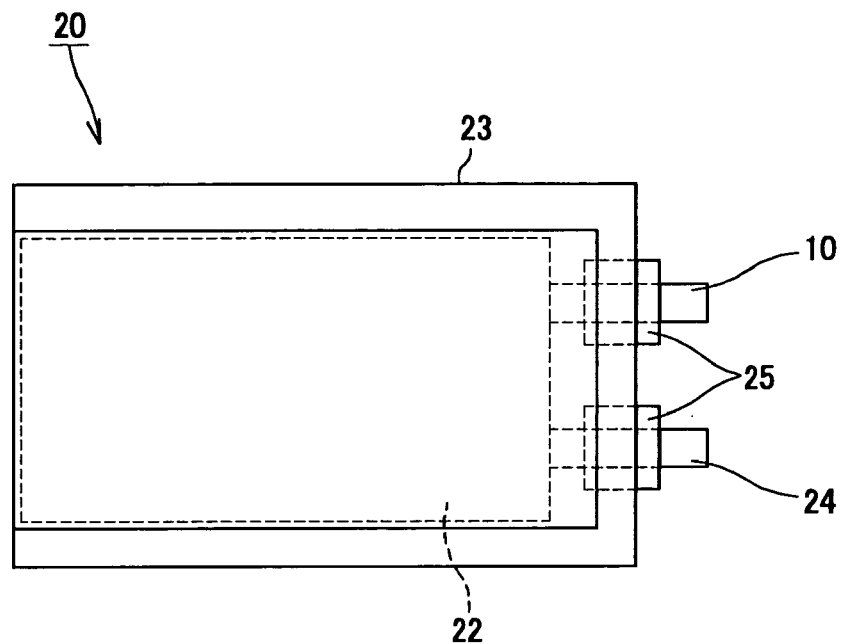
FIG. 9A is a see-through view seeing through and showing a part of the inner structure of the lithium-ion secondary battery.
Figure 9B:
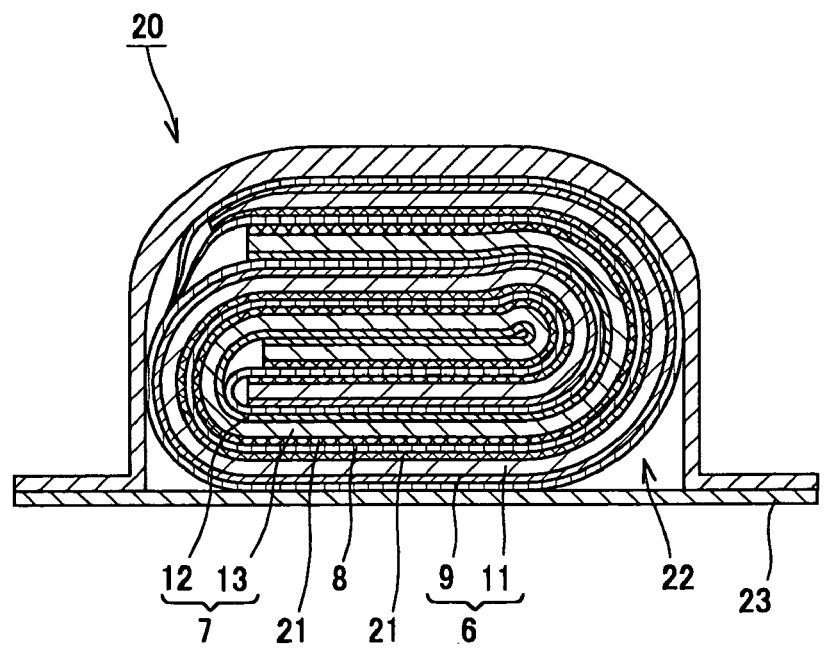
FIG. 9B is a sectional view thereof.

In the above-described embodiment of the present invention, the battery 1, using the non-aqueous electrolyte solution 4 obtained by dissolving the electrolyte salt in the non-aqueous solvent, is described as an example. However, the present invention is not limited thereto. As shown in FIGS. 9A and 9B, the present invention may be applied to a solid electrolyte battery (referred to hereinafter as a battery) 20 using no non-aqueous electrolyte solution 4. In the battery 20, parts common to the above-described battery 1 are designated by the same reference numerals and a detailed description thereof will be omitted.

In the battery 20, a polymer electrolyte 21 such as a solid polymer electrolyte having electrolyte salt contained in an organic polymer or a gel electrolyte having a polymer matrix impregnated with electrolyte salt and a non-aqueous solvent is formed on an anode composite mixture layer 11 of an elongated anode 6 and a cathode composite mixture layer 13 of an elongated cathode 7. While a separator 8 is provided between the anode 6 and the cathode 7, the anode and the cathode are spirally coiled to form a battery element 22 serving as a power generation element. This battery element 22 is sealed in an outer package material 23.

The anode 6 has a structure that an anode composite mixture including an anode active material and a binding agent is applied, dried and pressed on an anode current collector 9 to compression-mold an anode composite mixture layer 11 on the anode current collector 9. To the anode 6, an anode terminal 24 is connected to a prescribed position of the anode current collector 9 so as to protrude in the direction of width of the anode current collector 9. As the anode terminal 24, for instance, an elongated metallic piece made of copper, nickel, etc. is used. As the anode active material, the same materials as those of the above-described battery 1 are employed. In the anode 6, the same binding agent or the like as that of the above-described battery 1 is included in the anode composite mixture layer 11. Further, as the anode current collector 9, a foil type metal or a net type metal, etc. made of, for instance, copper is used like the above-described battery 1.

The cathode 7 has the same structure as that of the above-described battery 1. As a cathode active material, the same materials as those of the above-described battery 1 are employed. In the cathode 7, the same binding agent and conductive material, etc. as those of the above-described battery 1 are included in the cathode composite mixture layer 13. For a cathode current collector 12, a foil type metal or a net type metal or the like made of, for instance, aluminum is employed like the above-described battery 1.

As the polymer electrolyte 21, any of a solid inorganic electrolyte and a solid polymer electrolyte having lithium ion conductivity can be used. As the solid inorganic electrolyte, for example, lithium nitride, lithium iodide, etc. may be exemplified. On the other hand, the solid polymer electrolyte is composed of the above-described electrolyte salt and an organic polymer for dissolving it. As the organic polymer, for instance, ether polymers such as poly (ethylene oxide) or cross-linked materials thereof may be independently used or copolymerized or mixed with molecules and the obtained product may be used.

In the case of the gel electrolyte, as the polymer matrix, various kinds of polymers that absorb the above-described non-aqueous electrolyte solution to gel may be employed. For example, polyvinylidene fluoride, polyacrylonitrile, polyethylene oxide, polypropylene oxide, polymethacrylonitrile, etc. may be exemplified. Any one or a mixture of a plurality of these kinds of materials may be used.

In the outer package material 23, two or more layers of insulating layers or metal layers are laminated and stuck together by a laminate process so that an inner surface of a battery is made of an insulating layer. For the insulating layers, materials that show adhesive characteristics to a cathode terminal 10 or the anode terminal 24 are not especially limited to specific materials. Materials made of polyolefine resin such as polyethylene, polypropylene, modified polyethylene, modified polypropylene and copolymers of them, etc. are capable of lowering the penetrability and excellent in air-tightness are used. For the metal layers, aluminum, stainless steel, nickel, iron or the like, formed in a foil shape or a plate shape, is used. Further, an insulating layer made of, for instance, nylon is laminated on an outermost layer, so that strength against breakage or piercing can be enhanced.

The battery 20 having such a structure is manufactured as described below. First, the anode 6 is manufactured. When the anode 6 is manufactured, anode composite mixture, which includes the anode active material composed of a mixture of a plurality of kinds of spherical graphite having different average particle sizes and a binding agent, is prepared. This anode composite mixture is uniformly applied to the anode current collector 9 made of, for instance, a copper foil, so as to provide a part 6*a* to which the anode composite mixture is not applied and dried to form the anode composite mixture layer 11. The anode current collector including the anode composite mixture layer is cut to a prescribed dimension. Then, the anode terminal 24 is connected to the part 6*a* of the anode current collector 9 to which the anode composite mixture is not applied by, for instance, an ultrasonic welding method or a spot welding method. In such a manner, the elongated anode 6 is manufactured.

Then, the cathode 7 is manufactured like the above-described battery 1. When the cathode 7 is manufactured, cathode composite mixture including the cathode active material and a binding agent is prepared. This cathode composite mixture is uniformly applied and dried on the cathode current collector 12 made of, for instance, aluminum so as to provide a part 7*a* to which the cathode composite mixture is not applied to form the cathode composite mixture layer 13. The cathode current collector having the cathode composite mixture layer is cut to a prescribed dimension. Then, the cathode terminal 10 is connected to the part 7*a* of the cathode current collector 12 to which the cathode composite mixture is not applied by an ultrasonic welding method or a spot welding method or the like. In such a manner, the elongated cathode 7 is manufactured.

Subsequently, the polymer electrolytes 21 are respectively formed in layers on the main surface of the anode composite mixture layer 11 of the anode 6 and on the main surface of the cathode composite mixture layer 13 of the cathode 7 which are manufactured as described above. When electrolyte layers are formed, non-aqueous electrolyte solution 4 is prepared like the above-described battery 1. Then, the non-aqueous electrolyte solution 4 and an organic polymer are mixed and agitated with a non-aqueous solvent as a dilution solvent as desired to prepare sol electrolyte solution. This electrolyte solution is applied respectively on the main surface of the anode composite mixture layer 11 of the anode 6 and the main surface of the cathode composite mixture layer 13 of the cathode 7 to form electrolyte films. When the dilution solvent is used, the non-aqueous solvent thereof is evaporated to form a gel electrolyte. In such a manner, the polymer electrolytes 21 are respectively formed on the anode 6 and the cathode 7.

Figure 10:
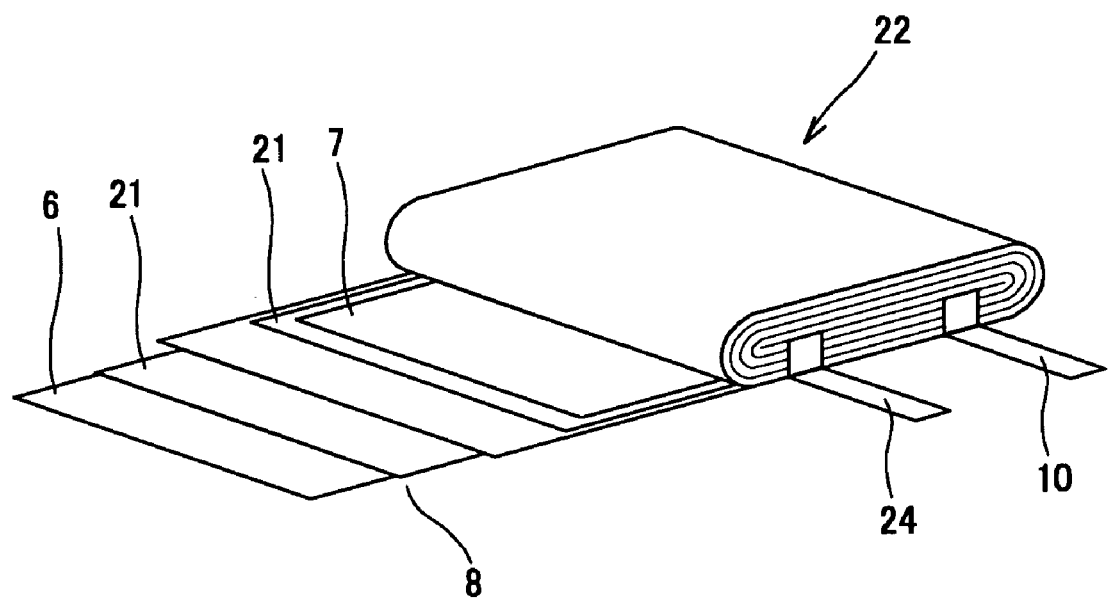
FIG. 10 is an explanatory view for explaining a manufacturing step of the lithium-ion secondary battery according to the present invention and a perspective view showing the battery element.

Then, as shown in FIG. 10, the anode 6 and the cathode 7 having the polymer electrolytes 21 formed on the main surfaces as described above are laminated through a separator 8 so that the electrolyte layers are opposed to each other. The laminated body is spirally coiled in a flat form in the longitudinal direction of the separator 8 to form a battery element 22. At this time, the anode terminal 24 and the cathode terminal 10 are adapted to protrude from one end face of the battery element 22.

Figure 11:
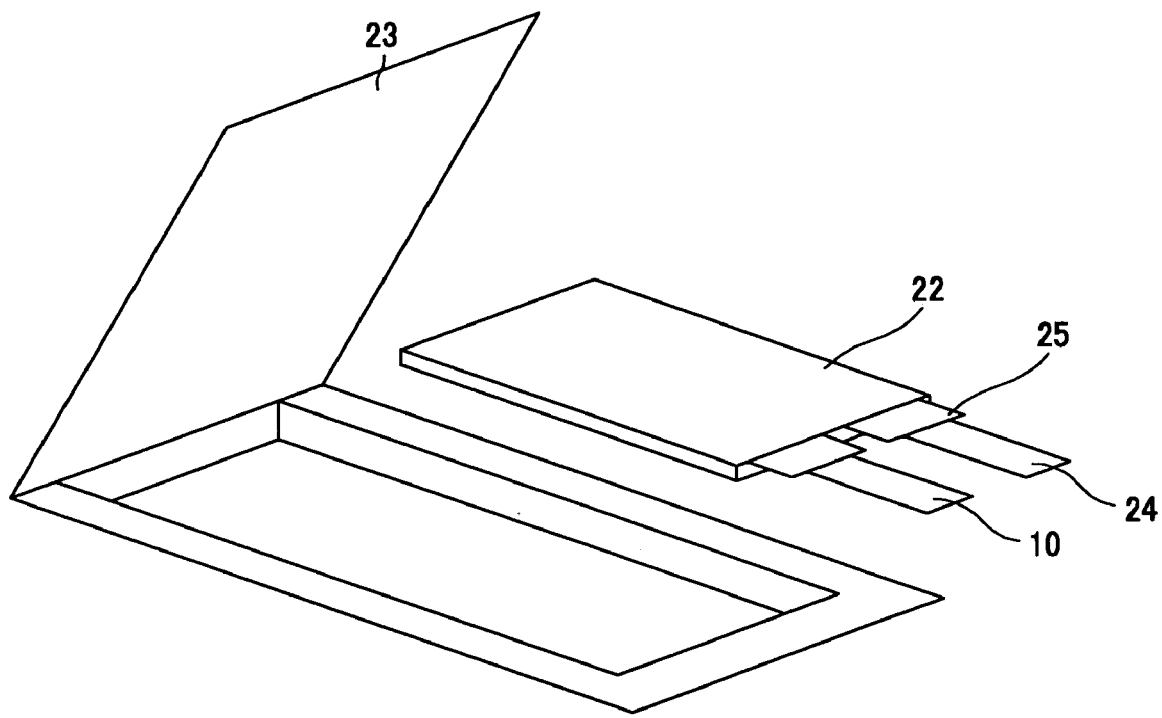
FIG. 11 is an explanatory view for explaining a manufacturing step of the lithium-ion secondary battery according to the present invention and a perspective view showing a state that the battery element is accommodated in an outer package material.

Then, as shown in FIG. 11, while the anode terminal 24 and the cathode terminal 10 provided in the battery element 22 are drawn out, the battery element is accommodated in the outer package material 23. At this time, the battery element is accommodated in the outer package material 23 in such a way that resin pieces 25 made of propylene having adhesive characteristics are interposed between the anode terminal 24 and the cathode terminal 10, and the outer package material 23. Thus, in the battery 20, the short-circuit between the anode terminal 24 and the cathode terminal 10 and the metal layer in the outer package material 23 or the deterioration of air-tightness or the like is prevented.

Figure 12:
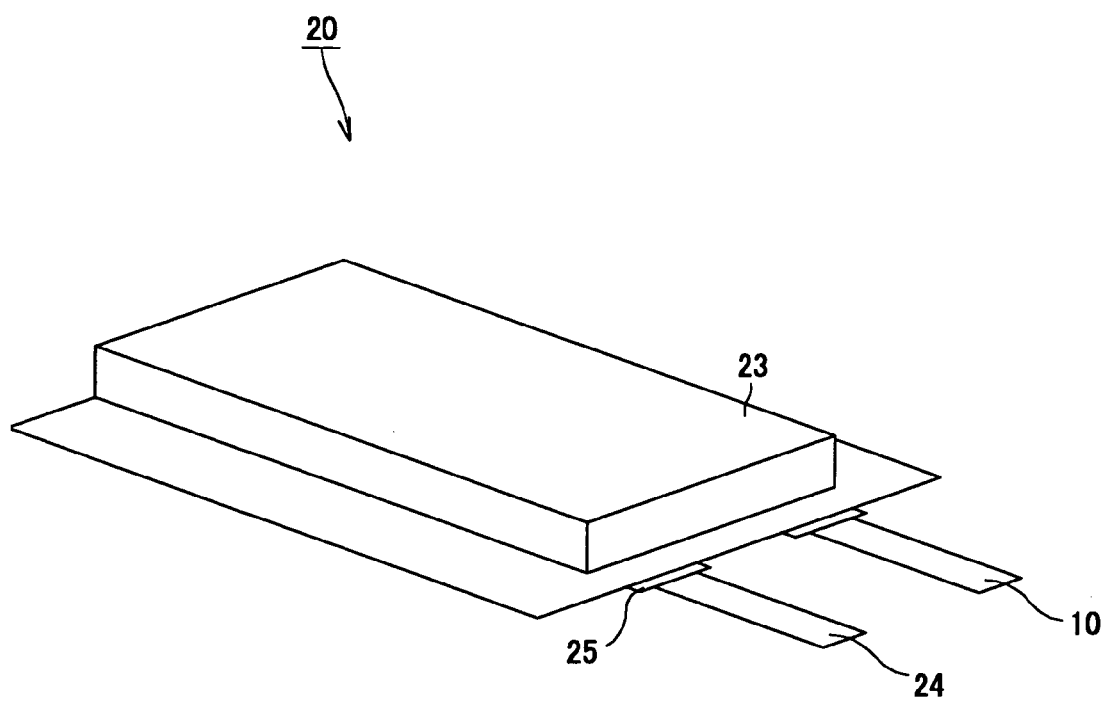
FIG. 12 is an explanatory view for explaining a manufacturing step of the lithium-ion secondary battery according to the present invention and a perspective view showing the completed lithium-ion secondary battery.

Then, as shown in FIG. 12, the peripheral edges of the outer package material 23 in which the battery element 22 is accommodated are stuck together to seal the battery element 22 in the outer package material 23. In such a manner, the battery using the polymer electrolytes 21 is produced.

In the battery 20 manufactured as described above, the mixture composed of a plurality of kinds of spherical graphite having different average particle sizes whose particle size distribution area is controlled to be narrow as the anode active material is employed like the above-described battery 1. Thus, the spherical graphite having a large particle size among the spherical graphite having different average particle sizes relatively decreases the surface area more than the spherical graphite having a small particle size. Accordingly, a reaction with the polymer electrolyte 21 is decreased to suppress the decrease of the capacity of the battery.

Further, in this battery 20, since the spherical graphite having the large particle size increases a volume relative to the surface area, a bulk part becomes large relative to the spherical graphite having the small particle size to increase the capacity of the battery.

Further, in this battery 20, the spherical graphite having the large particle size forms clearances of adequate sizes in the anode composite mixture layer 11 to retain the polymer electrolyte 21 and decrease an ionic resistance to the polymer electrolyte 21 in the anode 6 side. Thus, the deterioration of battery characteristics can be prevented.

Still further, in this battery 20, the clearances in the anode composite mixture layer 11 are efficiently filled with the spherical graphite having the small particle size among the spherical graphite having different average particle sizes while the spherical graphite having the small particle size leaves spaces in which a suitable amount of polymer electrolyte 21 can be retained. Accordingly, the volume density of the anode composite mixture layer 11 is enhanced to increase the capacity of the battery and improve energy density.

The form of the non-aqueous electrolyte battery to which the present invention is applied is not especially limited to specific forms such as a cylindrical type, a prismatic type, a coin type, a button type, etc. Further, the non-aqueous electrolyte battery may be formed in thin shapes, large shapes or various kinds of sizes. Further, in the above-described embodiments, the battery element 2 of the battery 1 and the battery element 22 of the battery 20 are spirally coiled. However, the present invention is not limited thereto. The present invention may be applied to non-aqueous electrolyte batteries using battery elements having structures described below. That is, for instance, a plurality of anodes and cathodes are laminated in multi-layers through separators, or an elongated anode and an elongated cathode are folded in a zigzag manner, which is called in a state of bellows through a separator.

In the above-described embodiments, the spherical graphite is used as the anode active material in the battery 1 and the battery 20, however, the present invention is not limited thereto. For instance, the spherical carbonaceous material that undergoes the above-described spherical process and the surface treatment is used so that the same effects as those of the battery 1 and the battery 20 can be obtained.

EXAMPLES

Now, as non-aqueous electrolyte batteries to which the present invention is applied, samples that lithium-ion secondary batteries using gel electrolyte are actually manufactured will be described below.

Sample 1 to Sample 68

Sample 1 to Sample 68 use a mixture of two kinds of MCMBs, which is called spherical graphite, having different average particle sizes as an anode active material. These Samples are produced under conditions such as particle sizes, mixing ratios, etc., of the spherical graphite as shown in Table 1 to Table 3.

TABLE 1

| | Spherical Graphite 1 | | | | |
| --- | --- | --- | --- | --- | --- |
| | | | | Particle Size Distribution | |
| | $D50$ ($\mu m$) | $D10$ ($\mu m$) | $D90$ ($\mu m$) | $\log(D50) - \log(D10)$ | $\log(D90) - \log(D50)$ |
| Sample 1 | 20 | 12.4 | 31.7 | 0.208 | 0.200 |
| Sample 2 | 20 | 12.4 | 31.7 | 0.208 | 0.200 |
| Sample 3 | 25 | 16.2 | 38.6 | 0.188 | 0.189 |
| Sample 4 | 30 | 19.3 | 44.7 | 0.192 | 0.173 |
| Sample 5 | 30 | 19.3 | 44.7 | 0.192 | 0.173 |
| Sample 6 | 30 | 19.3 | 44.7 | 0.192 | 0.173 |
| Sample 7 | 30 | 19.3 | 44.7 | 0.192 | 0.173 |
| Sample 8 | 30 | 19.3 | 44.7 | 0.192 | 0.173 |
| Sample 9 | 30 | 19.3 | 44.7 | 0.192 | 0.173 |
| Sample 10 | 35 | 23.2 | 52.4 | 0.179 | 0.175 |
| Sample 11 | 40 | 26.3 | 61.2 | 0.182 | 0.185 |
| Sample 12 | 40 | 26.3 | 61.2 | 0.182 | 0.185 |
| Sample 13 | 40 | 26.3 | 61.2 | 0.182 | 0.185 |
| Sample 14 | 30 | 18.1 | 49.7 | 0.219 | 0.219 |
| Sample 15 | 20 | 12.4 | 31.7 | 0.208 | 0.200 |
| Sample 16 | 20 | 12.4 | 31.7 | 0.208 | 0.200 |
| Sample 17 | 20 | 12.4 | 31.7 | 0.208 | 0.200 |
| Sample 18 | 20 | 12.4 | 31.7 | 0.208 | 0.200 |
| Sample 19 | 20 | 12.4 | 31.7 | 0.208 | 0.200 |
| Sample 20 | 30 | 19.3 | 44.7 | 0.192 | 0.173 |
| Sample 21 | 30 | 19.3 | 44.7 | 0.192 | 0.173 |
| Sample 22 | 30 | 19.3 | 44.7 | 0.192 | 0.173 |
| Sample 23 | 30 | 19.3 | 44.7 | 0.192 | 0.173 |
| Sample 24 | 40 | 26.3 | 61.2 | 0.182 | 0.185 |
| Sample 25 | 40 | 26.3 | 61.2 | 0.182 | 0.185 |
| Sample 26 | 40 | 26.3 | 61.2 | 0.182 | 0.185 |

| | Spherical Graphite 2 | | | | | Mixing Ratio Spherical Graphite 1/Spherical Graphite 2 |
| --- | --- | --- | --- | --- | --- | --- |
| | | | | Particle Size Distribution | | |
| | $D50$ ($\mu m$) | $D10$ ($\mu m$) | $D90$ ($\mu m$) | $\log(D50) - \log(D10)$ | $\log(D90) - \log(D50)$ | |
| Sample 1 | 5 | 3.1 | 8.1 | 0.208 | 0.210 | 70/30 |
| Sample 2 | 10 | 6.6 | 15.7 | 0.180 | 0.196 | 70/30 |
| Sample 3 | 12 | 7.6 | 18.3 | 0.198 | 0.183 | 70/30 |
| Sample 4 | 5 | 3.1 | 8.1 | 0.208 | 0.210 | 70/30 |
| Sample 5 | 8 | 4.9 | 12.7 | 0.213 | 0.201 | 70/30 |
| Sample 6 | 11 | 7.2 | 17.4 | 0.184 | 0.199 | 70/30 |
| Sample 7 | 12 | 7.6 | 18.3 | 0.198 | 0.183 | 70/30 |
| Sample 8 | 14 | 9.3 | 21.5 | 0.178 | 0.186 | 70/30 |
| Sample 9 | 16 | 10.8 | 24.1 | 0.171 | 0.178 | 70/30 |
| Sample 10 | 12 | 7.6 | 18.3 | 0.198 | 0.183 | 70/30 |
| Sample 11 | 12 | 7.6 | 18.3 | 0.198 | 0.183 | 70/30 |
| Sample 12 | 14 | 9.3 | 21.5 | 0.178 | 0.186 | 70/30 |
| Sample 13 | 16 | 10.8 | 24.1 | 0.171 | 0.178 | 70/30 |

TABLE 1-continued

| Sample | D50 | D10 | D90 | log(D50) − log(D10) | log(D90) − log(D50) | Mixing Ratio |
|---|---|---|---|---|---|---|
| Sample 14 | 12 | 7.3 | 19.8 | 0.216 | 0.217 | 70/30 |
| Sample 15 | 10 | 6.6 | 15.7 | 0.180 | 0.196 | 65/35 |
| Sample 16 | 10 | 6.6 | 15.7 | 0.180 | 0.196 | 70/30 |
| Sample 17 | 10 | 6.6 | 15.7 | 0.180 | 0.196 | 80/20 |
| Sample 18 | 10 | 6.6 | 15.7 | 0.180 | 0.196 | 85/15 |
| Sample 19 | 10 | 6.6 | 15.7 | 0.180 | 0.196 | 90/10 |
| Sample 20 | 12 | 7.6 | 18.3 | 0.198 | 0.183 | 65/35 |
| Sample 21 | 12 | 7.6 | 18.3 | 0.198 | 0.183 | 80/20 |
| Sample 22 | 12 | 7.6 | 18.3 | 0.198 | 0.183 | 85/15 |
| Sample 23 | 12 | 7.6 | 18.3 | 0.198 | 0.183 | 90/10 |
| Sample 24 | 15 | 9.8 | 22.3 | 0.185 | 0.172 | 65/35 |
| Sample 25 | 15 | 9.8 | 22.3 | 0.185 | 0.172 | 70/30 |
| Sample 26 | 15 | 9.8 | 22.3 | 0.185 | 0.172 | 80/20 |

TABLE 2

| | Spherical Graphite 1 | | | | | Spherical Graphite 2 | | | | | Mixing Ratio Spherical Graphite 1/ Spherical Graphite 2 |
|---|---|---|---|---|---|---|---|---|---|---|---|
| | Particle Size Distribution | | | | | Particle Size Distribution | | | | | |
| | D50 (μm) | D10 (μm) | D90 (μm) | log(D50) − log(D10) | log(D90) − log(D50) | D50 (μm) | D10 (μm) | D90 (μm) | log(D50) − log(D10) | log(D90) − log(D50) | |
| Sample 27 | 40 | 26.3 | 61.2 | 0.182 | 0.185 | 15 | 9.8 | 22.3 | 0.185 | 0.172 | 85/15 |
| Sample 28 | 40 | 26.3 | 61.2 | 0.182 | 0.185 | 15 | 9.8 | 22.3 | 0.185 | 0.172 | 90/10 |
| Sample 29 | 20 | 12.4 | 31.7 | 0.208 | 0.200 | — | — | — | — | — | 100/0 |
| Sample 30 | 30 | 19.3 | 44.7 | 0.192 | 0.173 | — | — | — | — | — | 100/0 |
| Sample 31 | 40 | 26.3 | 61.2 | 0.182 | 0.185 | — | — | — | — | — | 100/0 |
| Sample 32 | — | — | — | — | — | 5 | 3.1 | 8.1 | 0.208 | 0.210 | 0/100 |
| Sample 33 | — | — | — | — | — | 11 | 7.2 | 17.4 | 0.184 | 0.199 | 0/100 |
| Sample 34 | — | — | — | — | — | 16 | 10.8 | 24.1 | 0.171 | 0.178 | 0/100 |
| Sample 35 | 15 | 9.3 | 24.4 | 0.208 | 0.211 | 5 | 3.1 | 8.1 | 0.208 | 0.210 | 70/30 |
| Sample 36 | 15 | 9.3 | 24.4 | 0.208 | 0.211 | 7 | 4.3 | 11.3 | 0.212 | 0.208 | 70/30 |
| Sample 37 | 45 | 29.8 | 68.4 | 0.179 | 0.182 | 12 | 7.6 | 18.3 | 0.198 | 0.183 | 70/30 |
| Sample 38 | 50 | 31.8 | 75.0 | 0.197 | 0.176 | 12 | 7.6 | 18.3 | 0.198 | 0.183 | 70/30 |
| Sample 39 | 30 | 19.3 | 44.7 | 0.192 | 0.173 | 2 | 1.3 | 3.3 | 0.187 | 0.217 | 70/30 |
| Sample 40 | 20 | 12.4 | 31.7 | 0.208 | 0.200 | 3 | 1.9 | 4.8 | 0.198 | 0.204 | 70/30 |
| Sample 41 | 30 | 19.3 | 44.7 | 0.192 | 0.173 | 3 | 1.9 | 4.8 | 0.198 | 0.204 | 70/30 |
| Sample 42 | 30 | 19.3 | 44.7 | 0.192 | 0.173 | 18 | 12.4 | 26.5 | 0.162 | 0.168 | 70/30 |

TABLE 2-continued

| Sample | D50 | D10 | D90 | log(D50)−log(D10) | log(D90)−log(D50) | Mixing Ratio |
|---|---|---|---|---|---|---|
| Sample 43 | 18 | 12.4 | 26.5 | 0.162 | 0.168 | 70/30 |
| Sample 44 | 12 | 7.6 | 18.3 | 0.198 | 0.183 | 70/30 |
| Sample 45 | 12 | 7.6 | 18.3 | 0.198 | 0.183 | 70/30 |
| Sample 46 | 12 | 7.6 | 18.3 | 0.198 | 0.183 | 70/30 |
| Sample 47 | 12 | 7.0 | 18.3 | 0.234 | 0.183 | 70/30 |
| Sample 48 | 12 | 4.1 | 18.3 | 0.466 | 0.183 | 70/30 |
| Sample 49 | 12 | 7.0 | 18.3 | 0.234 | 0.183 | 70/30 |
| Sample 50 | 12 | 4.1 | 18.3 | 0.466 | 0.183 | 70/30 |
| Sample 51 | 12 | 7.6 | 18.3 | 0.198 | 0.183 | 70/30 |
| Sample 52 | 12 | 7.6 | 18.3 | 0.198 | 0.183 | 70/30 |

(Note: Sample 43–52 in Table 2 also include Spherical Graphite 1 data as follows:)

| Sample | Spherical Graphite 1 D50 | D10 | D90 | log(D50)−log(D10) | log(D90)−log(D50) |
|---|---|---|---|---|---|
| Sample 43 | 40 | 26.3 | 61.2 | 0.182 | 0.185 |
| Sample 44 | 20 | 12.4 | 31.7 | 0.208 | 0.200 |
| Sample 45 | 30 | 17.8 | 44.7 | 0.227 | 0.173 |
| Sample 46 | 30 | 9.9 | 44.7 | 0.481 | 0.173 |
| Sample 47 | 30 | 19.3 | 44.7 | 0.192 | 0.173 |
| Sample 48 | 30 | 19.3 | 44.7 | 0.192 | 0.173 |
| Sample 49 | 30 | 17.8 | 44.7 | 0.227 | 0.173 |
| Sample 50 | 30 | 9.9 | 44.7 | 0.481 | 0.173 |
| Sample 51 | 30 | 19.3 | 50.0 | 0.192 | 0.222 |
| Sample 52 | 30 | 19.3 | 74.3 | 0.192 | 0.394 |

TABLE 3

| | Spherical Graphite 1 | | | | | Spherical Graphite 2 | | | | | Mixing Ratio Spherical Graphite 1/ Spherical Graphite 2 |
|---|---|---|---|---|---|---|---|---|---|---|---|
| | Particle Size Distribution | | | | | Particle Size Distribution | | | | | |
| | D50 (μm) | D10 (μm) | D90 (μm) | log(D50) − log(D10) | log(D90) − log(D50) | D50 (μm) | D10 (μm) | D90 (μm) | log(D50) − log(D10) | log(D90) − log(D50) | |
| Sample 53 | 30 | 19.3 | 44.7 | 0.192 | 0.173 | 12 | 7.6 | 20.0 | 0.198 | 0.222 | 70/30 |
| Sample 54 | 30 | 19.3 | 44.7 | 0.192 | 0.173 | 12 | 7.6 | 28.4 | 0.198 | 0.374 | 70/30 |
| Sample 55 | 30 | 19.3 | 50.0 | 0.192 | 0.222 | 12 | 7.6 | 20.0 | 0.198 | 0.222 | 70/30 |
| Sample 56 | 30 | 19.3 | 74.3 | 0.192 | 0.394 | 12 | 7.6 | 28.4 | 0.198 | 0.374 | 70/30 |
| Sample 57 | 30 | 17.3 | 51.5 | 0.239 | 0.235 | 12 | 7.6 | 18.3 | 0.198 | 0.183 | 70/30 |
| Sample 58 | 30 | 13.5 | 62.3 | 0.347 | 0.317 | 12 | 7.6 | 18.3 | 0.198 | 0.183 | 70/30 |
| Sample 59 | 30 | 19.3 | 44.7 | 0.192 | 0.173 | 12 | 7.0 | 21.1 | 0.234 | 0.245 | 70/30 |
| Sample 60 | 30 | 19.3 | 44.7 | 0.192 | 0.173 | 12 | 5.4 | 28.3 | 0.347 | 0.373 | 70/30 |
| Sample 61 | 30 | 17.3 | 51.5 | 0.239 | 0.235 | 12 | 7.0 | 21.1 | 0.234 | 0.245 | 70/30 |
| Sample 62 | 30 | 13.5 | 62.3 | 0.347 | 0.317 | 12 | 5.4 | 28.3 | 0.347 | 0.373 | 70/30 |
| Sample 63 | 20 | 12.4 | 31.7 | 0.208 | 0.200 | 10 | 6.6 | 15.7 | 0.180 | 0.196 | 60/40 |
| Sample 64 | 30 | 19.3 | 44.7 | 0.192 | 0.173 | 12 | 7.6 | 18.3 | 0.198 | 0.183 | 60/40 |
| Sample 65 | 40 | 26.3 | 61.2 | 0.182 | 0.185 | 15 | 9.8 | 22.3 | 0.185 | 0.172 | 60/40 |
| Sample 66 | 20 | 12.4 | 31.7 | 0.208 | 0.200 | 10 | 6.6 | 15.7 | 0.180 | 0.196 | 95/5 |
| Sample 67 | 30 | 19.3 | 44.7 | 0.192 | 0.173 | 12 | 7.6 | 18.3 | 0.198 | 0.183 | 95/5 |
| Sample 68 | 40 | 26.3 | 61.2 | 0.182 | 0.185 | 15 | 9.8 | 22.3 | 0.185 | 0.172 | 95/5 |

In Table 1 to Table 3, 10% cumulative particle size from the side of a small particle size, when the particle size distribution is measured by a laser diffraction method, is designated by D10. Then, 50% cumulative particle size from the side of a small particle size is designated by D50, and 90% cumulative particle size from the side of a small particle size is designated by D90. Further, the spherical graphite of the large particle size of the spherical graphite having different average particle sizes is called spherical graphite 1. The spherical graphite of the small particle size is called spherical graphite 2.

Now, a method for producing the lithium-ion secondary batteries will be specifically described below as Sample 1 to Sample 68.

To manufacture the lithium-ion secondary battery, a cathode was first manufactured. When the cathode was formed, lithium cobaltate ($LiCoO_2$) of 92 wt % as a cathode active material was added to polyvinylidene fluoride (referred to hereinafter as PVdF) of 3 wt % as a binding agent, graphite of 5 wt % as a conductive material, and N-methyl-2-pyrrolidone (referred to hereinafter as NMP) as a solvent. The mixture was kneaded and dispersed by a planetary mixer to prepare cathode composite mixture. Then, the cathode composite mixture was uniformly applied to a single surface of an elongated aluminum foil having the thickness of 20 μm as a cathode current collector by using a die coater as an applicator, and dried at 100° C. for 24 hours under a pressure reduced state. Then, the aluminum foil thus obtained was compression-molded by a roll press machine and cut to a width of 48 mm and a length of 300 mm. In such a way, the plural cathodes were produced.

Then, the anode was manufactured. When the anode was formed, mixtures of two kinds of spherical graphite, shown in the columns of Samples 1 to 68 in Table 1 to Table 3, which were mixed in the mixing ratios shown in the columns of Samples 1 to 68 in Table 1 to Table 3, were respectively employed as anode active materials. The anode active materials of Samples 1 to 68 of 90 wt % were respectively added to PVdF of 10 wt % as a binding agent and NMP as a solvent, and the mixtures were kneaded and dispersed by a planetary mixer to respectively manufacture anode composite mixtures using Samples 1 to 68. Then, the anode composite mixtures were uniformly applied to single surfaces of elongated copper foils having the thickness of 20 μm as anode current collectors by using a die coater as an applicator, and dried at 120° C. for 24 hours under a pressure reduced state. Then, the copper foils thus obtained were compression-molded by a roll press machine and cut to width of 50 mm and length of 310 mm. In such a way, anodes of Samples 1 to 68 were produced.

Subsequently, electrolyte layers were respectively formed on the main surfaces of the plural cathodes and the anodes formed as described above. When the electrolyte layer was formed, non-aqueous electrolyte solution was prepared in which $LiPF_6$ was dissolved in a solvent obtained by mixing ethylene carbonate of 60 wt % with propylene carbonate of 40 wt % in the ratio of 0.8 mol/kg relative to the weight of the solvent. Then, the non-aqueous electrolyte solution was mixed and agitated with PVdF with which hexafluoropropylene was copolymerized in the ratio of 6% and dimethyl carbonate to prepare gel electrolyte solution in a sol state. Then, the gel electrolyte solution was applied respectively to the main surfaces of the cathodes and the anodes to evaporate dimethyl carbonate. In such a way, the electrolyte layers composed of the gel electrolytes were respectively formed on the main surfaces of the plural cathodes and the anodes.

Then, while porous polyethylene films having the thickness of 10 μm were interposed as separators between the cathodes and the anodes having the electrolyte layers formed on their main surfaces as described above, the cathodes and the anodes were stuck together so that the electrolyte layers were opposed to each other. Then, the obtained members were spirally coiled in the longitudinal directions of the cathodes in flat forms to form the battery elements of Samples 1 to 68. At this time, elongated cathode terminals made of aluminum were attached to arbitrary positions of the cathodes and elongated anode terminals made of nickel were attached to arbitrary positions of the anodes.

Then, while the cathode terminals and the anode terminals provided in the battery elements of these Samples 1 to 68 were drawn outside, the battery elements were accommodated in outer package materials of three layer structures that aluminum foils having the thickness of 50 μm were sandwiched in between polyolefine films having the thickness of 30 μm. At this time, the battery elements were accommodated in the outer package materials by providing propylene resin pieces showing adhesive characteristics between the cathode terminals and the anode terminals, and the outer package materials. Accordingly, in the battery elements, short-circuits of the cathode terminals and the anode terminals were prevented through the aluminum foils of the outer package materials, or the deterioration of the air-tightness or the like was prevented. Then, the peripheral edges of the outer package materials in which the battery elements were accommodated were stuck together to seal the battery elements in the outer package materials. As described above, the lithium-ion secondary batteries of Samples 1 to 68 were produced. In the following description, the lithium-ion secondary battery is referred to simply as a battery for convenience.

Then, for each of the batteries of Samples 1 to 68 manufactured as described above, the volume density of an anode composite mixture layer, an initial charging and discharging efficiency, an initial discharging capacity, discharge load characteristics, and a discharging capacity maintaining/retention ratio after a 500 cycle were measured.

The evaluated results of the volume density of the anode composite mixture layer, the initial charging and discharging efficiency, the initial discharging capacity, the discharge load characteristic, and the discharging capacity maintaining/retention ratio after the 500 cycle in each Sample are shown in Table 4 to Table 6.

TABLE 4

| | Volumetric Density of Anode Composite Mixture Layer (g/cm³) | Initial Charging And Discharging Efficiency (%) | Initial Discharging Capacity (mAh) |
|---|---|---|---|
| Sample 1 | 1.70 | 83 | 836 |
| Sample 2 | 1.70 | 85 | 849 |
| Sample 3 | 1.70 | 89 | 885 |
| Sample 4 | 1.70 | 83 | 833 |
| Sample 5 | 1.70 | 88 | 890 |
| Sample 6 | 1.70 | 91 | 909 |
| Sample 7 | 1.70 | 92 | 917 |
| Sample 8 | 1.70 | 93 | 927 |
| Sample 9 | 1.70 | 88 | 885 |
| Sample 10 | 1.70 | 91 | 912 |
| Sample 11 | 1.70 | 90 | 898 |
| Sample 12 | 1.70 | 90 | 910 |
| Sample 13 | 1.70 | 88 | 890 |
| Sample 14 | 1.70 | 89 | 900 |
| Sample 15 | 1.70 | 86 | 855 |
| Sample 16 | 1.70 | 94 | 847 |
| Sample 17 | 1.70 | 86 | 862 |
| Sample 18 | 1.70 | 86 | 859 |
| Sample 19 | 1.70 | 83 | 833 |
| Sample 20 | 1.70 | 90 | 904 |
| Sample 21 | 1.70 | 89 | 893 |
| Sample 22 | 1.70 | 90 | 898 |
| Sample 23 | 1.70 | 89 | 894 |
| Sample 24 | 1.70 | 88 | 883 |
| Sample 25 | 1.70 | 88 | 879 |
| Sample 26 | 1.70 | 91 | 915 |

TABLE 4-continued

| | Discharging Load Characteristics (%) | Capacity Maintaining/retention Ratio after 500 Cycle (%) |
|---|---|---|
| Sample 1 | 85 | 75 |
| Sample 2 | 85 | 81 |
| Sample 3 | 87 | 84 |
| Sample 4 | 85 | 75 |
| Sample 5 | 87 | 77 |
| Sample 6 | 91 | 82 |
| Sample 7 | 92 | 83 |
| Sample 8 | 91 | 79 |
| Sample 9 | 92 | 75 |
| Sample 10 | 90 | 80 |
| Sample 11 | 88 | 81 |
| Sample 12 | 88 | 75 |
| Sample 13 | 86 | 75 |
| Sample 14 | 86 | 75 |
| Sample 15 | 86 | 81 |
| Sample 16 | 85 | 80 |
| Sample 17 | 87 | 82 |
| Sample 18 | 85 | 79 |
| Sample 19 | 87 | 81 |
| Sample 20 | 86 | 81 |
| Sample 21 | 91 | 82 |
| Sample 22 | 89 | 83 |
| Sample 23 | 92 | 84 |
| Sample 24 | 89 | 80 |
| Sample 25 | 90 | 79 |
| Sample 26 | 92 | 82 |

TABLE 5

| | Volumetric Density of Anode Composite Mixture Layer (g/cm³) | Initial Charging/ Discharging Efficiency (%) | Initial Discharging Capacity (mAh) |
|---|---|---|---|
| Sample 27 | 1.70 | 91 | 911 |
| Sample 28 | 1.70 | 86 | 863 |
| Sample 29 | 1.68 | 82 | 821 |
| Sample 30 | 1.67 | 84 | 835 |
| Sample 31 | 1.67 | 84 | 840 |
| Sample 32 | 1.64 | 77 | 777 |
| Sample 33 | 1.66 | 76 | 759 |
| Sample 34 | 1.66 | 76 | 775 |
| Sample 35 | 1.68 | 76 | 764 |
| Sample 36 | 1.68 | 78 | 784 |
| Sample 37 | 1.68 | 77 | 769 |
| Sample 38 | 1.66 | 81 | 811 |
| Sample 39 | 1.70 | 72 | 727 |
| Sample 40 | 1.70 | 80 | 810 |
| Sample 41 | 1.70 | 79 | 795 |
| Sample 42 | 1.68 | 77 | 783 |
| Sample 43 | 1.68 | 78 | 785 |
| Sample 44 | 1.70 | 77 | 781 |
| Sample 45 | 1.70 | 77 | 780 |
| Sample 46 | 1.69 | 79 | 799 |
| Sample 47 | 1.68 | 77 | 770 |
| Sample 48 | 1.66 | 74 | 744 |
| Sample 49 | 1.65 | 73 | 735 |
| Sample 50 | 1.63 | 69 | 682 |
| Sample 51 | 1.68 | 79 | 799 |
| Sample 52 | 1.67 | 80 | 804 |

| | Discharging Load Characteristics (%) | Capacity Maintaining/retention Ratio after 500 Cycle (%) |
|---|---|---|
| Sample 27 | 91 | 81 |
| Sample 28 | 91 | 77 |
| Sample 29 | 83 | 57 |
| Sample 30 | 84 | 58 |
| Sample 31 | 84 | 49 |
| Sample 32 | 78 | 37 |
| Sample 33 | 80 | 41 |
| Sample 34 | 81 | 44 |
| Sample 35 | 74 | 69 |
| Sample 36 | 77 | 73 |
| Sample 37 | 87 | 72 |
| Sample 38 | 87 | 65 |
| Sample 39 | 70 | 64 |
| Sample 40 | 76 | 72 |
| Sample 41 | 72 | 68 |
| Sample 42 | 79 | 73 |
| Sample 43 | 81 | 68 |
| Sample 44 | 78 | 68 |
| Sample 45 | 79 | 75 |
| Sample 46 | 79 | 71 |
| Sample 47 | 79 | 68 |
| Sample 48 | 80 | 69 |
| Sample 49 | 73 | 66 |
| Sample 50 | 70 | 63 |
| Sample 51 | 81 | 72 |
| Sample 52 | 88 | 74 |

TABLE 6

| | Volumetric Density of Anode Composite Mixture Layer (g/cm³) | Initial Charging/ Discharging Efficiency (%) | Initial Discharging Capacity (mAh) |
|---|---|---|---|
| Sample 53 | 1.68 | 77 | 792 |
| Sample 54 | 1.69 | 80 | 798 |
| Sample 55 | 1.67 | 79 | 791 |
| Sample 56 | 1.65 | 75 | 755 |
| Sample 57 | 1.70 | 79 | 790 |
| Sample 58 | 1.69 | 81 | 814 |
| Sample 59 | 1.70 | 79 | 801 |
| Sample 60 | 1.68 | 80 | 806 |
| Sample 61 | 1.68 | 79 | 795 |
| Sample 62 | 1.65 | 75 | 755 |
| Sample 63 | 1.68 | 79 | 829 |
| Sample 64 | 1.68 | 81 | 815 |
| Sample 65 | 1.67 | 80 | 802 |
| Sample 66 | 1.68 | 80 | 798 |
| Sample 67 | 1.67 | 80 | 808 |
| Sample 68 | 1.68 | 80 | 804 |

| | Discharging Load Characteristics (%) | Capacity Maintaining/retention Ratio after 500 Cycle (%) |
|---|---|---|
| Sample 53 | 81 | 71 |
| Sample 54 | 90 | 73 |
| Sample 55 | 81 | 67 |
| Sample 56 | 90 | 68 |
| Sample 57 | 79 | 67 |
| Sample 58 | 80 | 72 |
| Sample 59 | 79 | 66 |
| Sample 60 | 74 | 69 |
| Sample 61 | 74 | 59 |
| Sample 62 | 72 | 62 |
| Sample 63 | 80 | 79 |
| Sample 64 | 81 | 80 |
| Sample 65 | 83 | 78 |
| Sample 66 | 81 | 75 |
| Sample 67 | 84 | 78 |
| Sample 68 | 84 | 72 |

In each Sample, a constant-current and constant-voltage charging operation of 0.2 C and 4.2 V was carried out and a constant-current discharging operation having a current value of 0.2 C up to 3 V was carried out. An initial discharging capacity is a discharging capacity when charging and discharging operations were performed under the above-described conditions. In this Example, Samples having the initial discharging capacity of 830 mAh or higher were considered to be good products. An initial charging and discharging efficiency is a ratio of the initial discharging capacity relative to an obtained initial charging capacity. In this Example, Samples having the initial charging and discharging efficiency of 83% or higher were considered to be good products. Discharge load characteristics show a ratio of the discharging capacity upon discharging under 3 C relative to the discharging capacity upon discharging under 0.2 C. In this Example, Samples having the discharge load characteristics of 85% or higher were considered to be good products. A discharging capacity maintaining/retention ratio after a 500 cycle is a ratio of a discharging capacity of a 500th cycle relative to the initial discharging capacity when the charging and discharging operations are carried out 500 times under the above-described conditions. In this Example, Samples having the discharging capacity maintaining/retention ratio after a 500 cycle of 75% or higher were considered to be good products.

As apparent from the evaluated results shown in Table 4 and Table 5, in Sample 7 using the mixture of spherical graphite of a large particle size and spherical graphite of a small particle size as an anode active material, the volume density of the anode composite mixture layer is higher than those of Samples 29 to 31 using only spherical graphite of a large particle size for an anode active material. Further, the initial charging and discharging efficiency, the initial discharging capacity, and the discharge load characteristics of Sample 7 are higher than those of Samples 29 to 31. Especially, the discharging capacity maintaining/retention ratio after a 500 cycle of Sample 7 is extremely higher than those of Samples 29 to 31.

In Samples 29 to 31, since the spherical graphite of a small particle size, whose average particle size is located within a range of 5 μm to 16 μm, is not mixed in the anode active material, clearances in the anode composite mixture layer, produced due to the contact of two or more spherical graphite of a large particle size, are not filled with the spherical graphite. Thus, the volume density of the anode composite mixture layer is decreased. Then, when the clearances are present in the anode composite mixture layer, while charging and discharging operations are repeated, the clearances become large so that the contact of the spherical graphite is separated to increase an ionic resistance to the electrolyte of an anode side. Thus, the capacity of a battery is decreased and the discharge load characteristics or cyclic characteristics are deteriorated.

As apparent from the evaluated results shown in Table 4 and Table 5, in Sample 7 using the mixture of the spherical graphite of the large particle size and the spherical graphite of the small particle size as an anode active material, the volume density of the anode composite mixture layer is higher than those of Sample 32 to 34 using only the spherical graphite of the small particle size for an anode active material. Further, the initial charging and discharging efficiency, the initial discharging capacity, and the discharge load characteristics of Sample 7 are higher than those of Samples 32 to 34. Especially, the discharging capacity maintaining/retention ratio after a 500 cycle of Sample 7 is extremely higher than those of Samples 32 to 34.

In Samples 32 to 34, since the spherical graphite of the large particle size whose average particle size is located within a range of 20 μm to 40 μm is not mixed in the anode active material, the anode composite mixture layer is filled with the spherical graphite without spaces. Thus, pressure is excessively exerted on the spherical graphite under a compression molding upon manufacturing the anode so that the surfaces of particles of the spherical graphite are broken. Accordingly, in Samples 32 to 34, since the anode active material cracks under the compression molding upon manufacturing the anode, the volume density of the anode composite mixture layer is hardly increased. In Samples 32 to 34, when the surfaces of the particles of the spherical graphite are broken, a bulk part high in reactivity with the electrolyte is exposed. Thus, the anode is degraded due to the reaction with the electrolyte to decrease the discharging capacity and lower the initial charging and discharging efficiency or the initial discharging capacity. Further, since there is no space for retaining the electrolyte in the anode composite mixture layer, the ionic resistance to the electrolyte of the anode side is increased and battery characteristics such as the discharge load characteristics or the cyclic characteristics are deteriorated.

On the contrary, in Sample 7, the mixture of the spherical graphite of the large particle size and the spherical graphite of the small particle size is used for the anode active material. Since the spherical graphite of the large particle size decreases its surface area relative to the spherical graphite of the small particle size, the reaction with the electrolyte is reduced to suppress the decrease of the capacity of the battery. Further, in Sample 7, since the spherical graphite of the large particle size has a large volume relative to surface area, a bulk part is large relative to the spherical graphite of the small particle size to increase the capacity of the battery. Further, in Sample 7, the spherical graphite of the large particle size forms clearances of suitable sizes in the anode composite mixture layer to retain the electrolyte. In Sample 7, the clearances in the anode composite mixture layer are efficiently filled with the spherical graphite of the small particle size, while spaces capable of retaining a suitable amount of electrolyte are left unfilled.

Accordingly, in Sample 7, the mixture of the spherical graphite of the large particle size and the spherical graphite of the small particle size is used for the anode active material, so that the volume density of the anode composite mixture layer is increased and the capacity of the battery is increased. Therefore, the volume density of the anode composite mixture layer is increased, the initial charging and discharging efficiency and the initial discharging capacity can be increased and the ionic resistance to the electrolyte of the anode side is decreased. Thus, the deterioration of the discharge load characteristics and the cyclic characteristics can be prevented.

As described above, the use of the mixture of spherical graphite of large particle size and spherical graphite of the small particle size for the anode active material is remarkably effective in manufacturing a battery having a high volume density of the anode composite mixture layer and excellent in battery characteristics such as charging and discharging cyclic characteristics.

As apparent from the evaluated results shown in Table 4 and Table 5, in Sample 1 to 13 in which the average particle size of the spherical graphite of the large particle size is located within a range of 20 μm to 40 μm, the volume density of the anode composite mixture layer is higher than those of Samples 35 and 36 in which the average particle size of the spherical graphite of the large particle size is 15 μm. The initial charging and discharging efficiency, the initial discharging capacity, and the discharging capacity maintaining/retention ratio after a 500 cycle of Samples 1 to 13 are higher than those of Samples 35 and 36.

In Samples 35 and 36, the average particle size of the spherical graphite of the large particle size is 15 μm and the particle size is too small and is not substantially different from the range of the average particle size of spherical graphite of small particle size. Accordingly, the surfaces of the particles of the spherical graphite are broken similarly to Samples 32 to 34. Consequently, in Samples 35 and 36, the spherical graphite cracks under the compression molding upon manufacturing the anode and the volume density of the anode composite mixture layer is hardly increased. Further, due to the same reasons as those of Samples 32 to 34, the initial charging and discharging efficiency or the initial discharging capacity is low and the battery characteristics such as cyclic characteristics are deteriorated. Further, since the radii of particles are too near to each other, adequate clearances cannot be formed to deteriorate load characteristics.

As apparent from the evaluated results shown in Table 4 and Table 5, in Sample 1 to 13, in which the average particle size of the spherical graphite of the large particle size is located within a range of 20 μm to 40 μm, the volume density of the anode composite mixture layer is higher than those of Samples 37 and 38 in which the average particle size of the spherical graphite of the large particle size is 45 μm or larger. The initial charging and discharging efficiency, the initial discharging capacity, and the discharging capacity maintaining/retention ratio after a 500 cycle of Samples 1 to 13 are higher than those of Samples 37 and 38.

In Samples 37 and 38, the average particle size of the spherical graphite of the large particle size is 45 μm or larger and the particle size is too large. Accordingly, the volume density of the anode composite mixture layer is hardly increased under the compression molding upon manufacturing the anode. Since particles crack due to the compression molding, the charging and discharging efficiency and the discharging capacity are decreased, and cyclic characteristics are deteriorated.

On the other hand, in Samples 1 to 13, the average particle size of the spherical graphite of the large particle size of two kinds of spherical graphite used as the anode active material is an appropriate size located within a range of 20 μm to 40 μm. Thus, the spherical graphite of the large particle decreases its surface area relative to that of the spherical graphite of the small particle size, so that a reaction with the electrolyte is reduced to suppress the deterioration of the capacity of the battery. Further, in Samples 1 to 13, since the spherical graphite of the large particle size having an appropriate size increases a volume relative to the surface area, the bulk part becomes large relative to the spherical graphite of the small particle size to increase the capacity of the battery. Further, in Samples 1 to 13, the average particle size of the spherical graphite of the large particle size is located within an adequate range. Accordingly, the clearances of suitable sizes can be formed in the anode composite mixture layer and are efficiently filled with the spherical graphite of the small particle size, while spaces are left unfilled in which a suitable amount of electrolyte can be retained.

Therefore, in Samples 1 to 13, the volume density of the anode composite mixture layer is high and the initial charging and discharging efficiency or the initial discharging capacity can be increased. Further, the ionic resistance relative to the electrolyte of the anode side is decreased to prevent the deterioration of the discharge load characteristics or the cyclic characteristics.

As described above, when the battery is manufactured by employing the mixture of the spherical graphite of the large particle size and the spherical graphite of the small particle size for the anode active material, the average particle size of the spherical graphite of the large particle size is located within a range of 20 μm to 40 μm. The use of the above-described range is very effective in manufacturing a battery having a high volume density of the anode composite mixture layer and excellent in its battery characteristics such as charging and discharging efficiency characteristics, discharging capacity characteristics, discharge load characteristics and charging, and discharging cyclic characteristics.

As apparent from the evaluated results shown in Table 4 and Table 5, in Sample 1 to 13, in which the average particle size of the spherical graphite of the small particle size is located within a range of 5 μm to 16 μm, the initial charging and discharging efficiency, the initial discharging capacity, the discharge load characteristics, and the discharging capacity maintaining/retention ratio after a 500 cycle are higher than those of Samples 39 to 41 in which the average particle size of the spherical graphite of the small particle size is 3 μm or smaller.

In Samples 39 to 41, since the average particle size of the spherical graphite of the small particle size is 3 μm or smaller and the particle size is too small, not only the clearances of the anode composite mixture layer, but also spaces for retaining the electrolyte are filled with the spherical graphite of the small particle size. Thus, an electric contact between the anode and the electrolyte is decreased to increase an electric resistance of the anode side. As a result, the capacity of the battery is reduced, cyclic characteristics are deteriorated, and especially, load characteristics are degraded.

As apparent from the evaluated results shown in Table 3 and Table 5, in Samples 1 to 13, in which the average particle size of the spherical graphite of the small particle size is located within a range of 5 μm to 16 μm, the volume density of the anode composite mixture layer, the initial charging and discharging efficiency, the initial discharging capacity, the discharge load characteristics, and the discharging capacity maintaining/retention ratio after a 500 cycle are higher than those of Samples 42 and 43 in which the average particle size of the spherical graphite of the small particle size is 18 μm.

In Samples 42 and 43, since the average particle size of the spherical graphite of a small particle size is 18 μm and the particle size is too large and is not substantially different from a range of the average particle size of the spherical graphite of the large particle size, clearances in the anode composite mixture layer produced due to the contact of two or more spherical graphite of a large particle size are not properly filled with the spherical graphite of the small particle size similarly to Samples 29 to 31. Thus, the volume density of the anode composite mixture layer is decreased. Then, in Samples 42 and 43, when the clearances are present in the anode composite mixture layer, while charging and discharging operations are repeated, the clearances become large so that the contact of the spherical graphite is separated to increase an ionic resistance to the electrolyte of an anode side. Thus, the capacity of a battery is decreased and the discharge load characteristics or the cyclic characteristics are deteriorated. Further, in Samples 42 and 43, since there is no difference in average particle size between the spherical graphite of the small particle size and the spherical graphite of the large particle size, pressure is excessively exerted on the spherical graphite under the compression molding upon forming the anode. Thus, the spherical graphite cracks to expose the bulk part of the spherical graphite high in its reactivity with a non-aqueous electrolyte. The anode is deteriorated due to the reaction with the electrolyte to decrease the discharging capacity.

On the other hand, in Samples 1 to 13, the average particle size of the spherical graphite of the small particle size of two kinds of spherical graphite used as the anode active material is an appropriate size located within a range of 5 μm to 16 μm. Accordingly, the clearances in the anode composite mixture layer are efficiently filled with the spherical graphite of the small particle size while spaces are left unfilled in which a suitable amount of electrolyte can be retained.

Therefore, in Samples 1 to 13, the volume density of the anode composite mixture layer becomes high and the capacity of the battery is increased, and the initial charging and discharging efficiency and the initial discharging capacity can be increased. Further, theionic resistance relative to the electrolyte of the anode side is decreased to prevent the deterioration of the discharge load characteristics or the cyclic characteristics.

As described above, when the battery is manufactured by employing the mixture of the spherical graphite of the large particle size and the spherical graphite of the small particle size for the anode active material, the average particle size of the spherical graphite of the small particle size is located within a range of 5 μm to 16 μm. The use of the above-described range is very effective in manufacturing a battery having a high volume density of the anode composite mixture layer and excellent in its battery characteristics such as charging and discharging efficiency characteristics, discharging capacity characteristics, discharge load characteristics, and charging and discharging cyclic characteristics.

As apparent from the evaluated results shown in Table 4 and Table 5, in Sample 2, in which the average particle size of the spherical graphite of the small particle size is 0.55 times the average particle size of the spherical graphite of the large particle size or smaller, the initial charging and discharging efficiency, the initial discharging capacity, the discharge load characteristics, and the discharging capacity maintaining/retention ratio after a 500 cycle are higher than those of Sample 44 in which the average particle size of the spherical graphite of the small particle size is 0.6 times the average particle size of the spherical graphite of the large particle size.

In Sample 44, since the average particle size of the spherical graphite of the small particle size is 0.6 times the average particle size of the spherical graphite of the large particle size and there is no difference in average particle size between the spherical graphite of the small particle size and the spherical graphite of the large particle size, pressure is excessively exerted on the spherical graphite under the compression molding upon forming the anode. Thus, the spherical graphite cracks to expose the bulk part of the spherical graphite high in its reactivity with an electrolyte. The anode is deteriorated due to the reaction with the electrolyte to decrease the discharging capacity. Further, in Sample 44, the anode is deteriorated to increase the ionic resistance to the electrolyte of the anode side. Thus, the discharge load characteristics or the cyclic characteristics are deteriorated.

On the other hand, in Sample 2, the average particle size of the spherical graphite of the small particle size is 0.55 times the average particle size of the spherical graphite of the large particle size or smaller, and the particle size of the spherical graphite of the small particle size is set to be suitably small relative to the particle size of the spherical graphite of the large particle size. Accordingly, an operational effect by the spherical graphite of the large particle size and an operational effect by the spherical graphite of the small particle size can be obtained in the same manner as that of the above-described Sample 7. Therefore, in Sample 2, the anode composite mixture layer is filled with the spherical graphite that does not crack. Thus, the initial charging and discharging efficiency and the initial discharging capacity can be increased, and the ionic resistance relative to the electrolyte of the anode side can be lowered to prevent the deterioration of the discharge load characteristics and the cyclic characteristics.

As described above, when the battery is manufactured by employing the mixture of the spherical graphite of the large particle size and the spherical graphite of the small particle size for the anode active material, the average particle size of the spherical graphite of the small particle size is 0.55 times the average particle size of the spherical graphite of the large particle size, or smaller. The use of the above-described range is very effective in manufacturing a battery excellent in its battery characteristics such as charging and discharging efficiency characteristics, discharging capacity characteristics, discharge load characteristics, and charging and discharging cyclic characteristics.

In Sample 14, shown in Table 1, particle size distributions represented by the expressions of $\log(D50)-\log(D10)$ and $\log(D90)-\log(D50)$ in the spherical graphite of the large particle size and the spherical graphite of the small particle size show values not higher than 0.22. The particle size distribution areas of two kinds of spherical graphite are controlled to be located in narrow ranges. On the other hand, in Samples 45 to 50, shown in Table 2, particle size distributions represented by the expression of $\log(D50)-\log(D10)$ have values larger than 0.22. At least the particle size distribution area of any one of two kinds of spherical graphite is wide.

Then, as apparent from the evaluated results of Table 4 and Table 5, in Sample 14, the initial charging and discharging efficiency, the initial discharging capacity, and the discharge load characteristics are higher than those of Samples 45 to 50.

Further, in Samples 51 to 56 shown in Table 2 and Table 3, particle size distributions represented by the expression of $\log(D90)-\log(D50)$ have values larger than 0.22. At least the particle size distribution area of any one of two kinds of spherical graphite is wide.

Then, as apparent from the evaluated results shown in Table 4 to Table 6, in Sample 14, the volume density of the anode composite mixture layer is higher than those of Samples 51 to 56. The initial charging and discharging efficiency, the initial discharging capacity, and the discharging capacity maintaining/retention ratio after a 500 cycle of Sample 14 are higher than those of Samples 51 to 56.

Further, in Samples 57 to 62, shown in Table 3, particle size distributions represented by the expressions of $\log(D50)-\log(D10)$ and $\log(D90)-\log(D50)$ have values larger than 0.22. At least the particle size distribution area of any one of two kinds of spherical graphite is wide.

Then, as apparent from the evaluated results shown in Table 4 and Table 6, in Sample 14, the initial charging and discharging efficiency, the initial discharging capacity, the discharge load characteristics, and the discharging capacity maintaining/retention ratio after a 500 cycle of Sample 14 are higher than those of Samples 57 to 62.

As described above, it is understood that Sample in which the particle size distribution of the anode active material is controlled to be narrow, like Sample 14, has excellent battery characteristics.

As described above, in Samples 45 to 62, the particle size distributions represented by the expressions of $\log(D50)-\log(D10)$ and $\log(D90)-\log(D50)$ in the spherical graphite of the large particle size and the spherical graphite of the small particle size have at least one value larger than 0.22 and the particle size distribution areas are widened. Accordingly, it is difficult to efficiently fill the clearances in the anode composite mixture layer produced due to the contact of two or more of spherical graphite of the large particle size with the spherical graphite of the small particle size. Further, it is difficult to improve the volume density of the anode composite mixture layer.

Especially, in the spherical graphite of the large particle size, when the particle size distribution area of the spherical graphite of large particle size represented by the expression of log(D90)–log(D50), not only the volume density of the anode composite mixture layer is decreased, but also the clearances exist in the anode composite mixture layer. Consequently, while charging and discharging operations are repeated, the clearances become large to separate the contact of the spherical graphite. Thus, an ionic resistance to the electrolyte of the anode side is increased to decrease the capacity of the battery and deteriorate the discharge load characteristics or the cyclic characteristics. Further, in this case, pressure is expressively exerted on the spherical graphite under the compression molding upon manufacturing the anode, so that the spherical graphite cracks to expose the bulk part of the spherical graphite high in its reactivity with the electrolyte. A reaction with the electrolyte causes the anode to be deteriorated and the discharging capacity to be decreased.

On the other hand, in the spherical graphite of the small particle size, when the particle size distribution area of the spherical graphite of small particle size represented by the expression of log(D50)–log(D10) is wide, the anode composite mixture layer is filled with the spherical graphite in a fine powdered state without spaces. Thus, there is no space for retaining the electrolyte in the anode composite mixture layer. Consequently, an ionic resistance to the electrolyte of the anode side is increased to deteriorate the discharge load characteristics and the cyclic characteristics. Further, in this case, the spherical graphite in a fine powdered state has a large surface area relative to a volume as compared with the spherical graphite of the large particle size. This means that, while a capacity is small, reactivity with the electrolyte is high to decrease the capacity. Accordingly, in the spherical graphite of the small particle size, the particle size distribution area of the spherical graphite of smaller particle size is wide. In this case, the discharging capacity is decreased due to the reaction with the electrolyte to decrease the initial charging and discharging efficiency and the initial discharging capacity.

As compared therewith, in Sample 14, the particle size distributions represented by the expressions of log(D50)–log(D10) and log(D90)–log(D50) in the spherical graphite of the large particle size and the spherical graphite of the small particle size have values not larger than 0.22 and the particle size distribution areas of two kinds of spherical graphite are controlled to be narrow. Therefore, the operational effect by the spherical graphite of the large particle size and the operational effect by the spherical graphite of the small particle size can be obtained like the above-described Sample 7. Accordingly, in Sample 14, the volume density of the anode composite mixture layer is increased to increase the capacity of the battery. Thus, the volume density of the anode composite mixture layer is high, the initial charging and discharging efficiency and the initial discharging capacity can be increased and the ionic resistance to the electrolyte of the anode side can be lowered to prevent the deterioration of the discharge load characteristics and the cyclic characteristics.

As described above, the battery is manufactured by employing the mixture of the spherical graphite of the large particle size and the spherical graphite of the small particle size for the anode active material. In this case, it is very effective to control the particle size distribution areas in the spherical graphite of the large particle size and the spherical graphite of the small particle size to be narrow in manufacturing the battery having the high volume density of the anode composite mixture layer and excellent in its battery characteristics such as charging and discharging efficiency characteristics, discharging capacity characteristics, discharge load characteristics, and charging and discharging cyclic characteristics.

As apparent from the evaluated results shown in Table 4 to Table 6, in Samples 15 to 28, in which the spherical graphite of the large particle size is mixed with the spherical graphite of the small particle size within a range of the weight ratio of 65:35 through 90:10, the volume density of the anode composite mixture layer, the initial charging and discharging efficiency, the initial discharging capacity, and the discharge load characteristics are higher than those of Samples 63 to 65 in which the spherical graphite of the large particle size is mixed with the spherical graphite of the small particle size in the weight ratio of 60:40.

In Samples 63 to 65, the spherical graphite of the large particle size is mixed in the weight ratio as small as 60% relative to all of the spherical graphite. The spherical graphite of the small particle size having a large surface area and a high reactivity with the electrolyte is too much. Accordingly, the capacity and safety of the battery lowered. Further, in Samples 63 to 65, since a quantity of the spherical graphite of the small particle size is also more than a proper value, the volume density cannot be increased. Further, even spaces for retaining the electrolyte in the anode active material are filled with the spherical graphite of the small particle size. Thus, the electrolyte relative to the anode composite mixture layer is decreased and the ionic resistance to the electrolyte of the anode side is increased to deteriorate the discharge load characteristics.

As apparent from the evaluated results shown in Table 4 to Table 6, in Samples 15 to 28, in which the spherical graphite of the large particle size is mixed with the spherical graphite of the small particle size within a range of the weight ratio of 65:35 through 90:10, the volume density of the anode composite mixture layer, the initial charging and discharging efficiency, the initial discharging capacity, the discharge load characteristics, and the discharging capacity maintaining/retention ratio after a 500 cycle are higher than those of Samples 66 to 68 in which the spherical graphite of the large particle size is mixed with the spherical graphite of the small particle size in the weight ratio of 95:5.

In Samples 66 to 68, the spherical graphite of the large particle size is mixed in the weight ratio as high as 95% relative to all of the spherical graphite. A quantity of the spherical graphite of the small particle size is too small. Therefore, the clearances in the anode composite mixture layer are hardly appropriately filled with the spherical graphite of the small particle size. Thus, the volume density of the anode composite mixture layer is decreased to lower the capacity of the battery. Further, in Samples 66 to 68, not only the volume density of the anode composite mixture layer is decreased, but also the clearances exist in the anode composite mixture layer. Thus, while charging and discharging operations are repeated, the clearances become large so that the contact of the spherical graphite is separated to increase the ionic resistance to the electrolyte of the anode side, lower the capacity of the battery, and deteriorate the discharge load characteristics and the cyclic characteristics.

On the contrary, in Samples 15 to 28, the spherical graphite of the large particle size is mixed with the spherical graphite of the small particle size within a range of weight ratio of 65:35 through 90:10. The mixing ratio of two kinds of spherical graphite is located within a proper range. Accordingly, the operational effect by the spherical graphite of the large particle size and the operational effect by the spherical graphite of the small particle size can be obtained like the above-described Sample 7. Therefore, in Samples 15 to 28, the volume density of the anode composite mixture layer is increased to increase the capacity of the battery. Thus, the volume density of the anode composite mixture layer is high, the initial charging and discharging efficiency and the initial discharging capacity can be increased, and the ionic resistance to the electrolyte of the anode side can be lowered to prevent the deterioration of the discharge load characteristics and the cyclic characteristics.

As described above, when a battery is manufactured by employing the mixture of the spherical graphite of the large particle size and the spherical graphite of the small particle size for the anode active material, it is very effective to mix the spherical graphite of large particle size with the spherical graphite of the small particle size within a range of weight ratio of 65:35 through 90:10 in manufacturing the battery having a high volume density of the anode composite mixture layer and excellent in its battery characteristics such as charging and discharging efficiency characteristics, discharging capacity characteristics, discharge load characteristics, and charging and discharging cyclic characteristics.

Now, as non-electrolyte batteries to which the present invention is applied, Samples 69 to 74 were manufactured wherein the anode active material in the above-described Sample 1 was changed to flake natural graphite, crushed artificial graphite obtained from bulk mesophase or the like, and a spherical carbonaceous material obtained by applying a spherical treatment and a surface treatment to hard carbon. These Samples, Samples 69 to 74, were produced by using anode actives materials having conditions such as particle sizes and mixing ratios as shown in Table 7.

material of a large particle size of spherical carbonaceous materials having different average particle sizes is called an anode active material 1. A carbonaceous material of a small particle size is called an anode active material 2.

Sample 69

In Sample 69, a battery was manufactured in the same manner as that of Sample 1 except that two kinds of natural graphite spherically pulverized (referred to hereinafter as spherical natural graphite), having different particle sizes shown in Table 7, were used as the anode active material.

Sample 70

In Sample 70, a battery was manufactured in the same manner as that of Sample 1 except that two kinds of bulk mesophase artificial graphite spherically pulverized (referred to hereinafter as spherical bulk artificial graphite), having different particle sizes shown in Table 7, were used as the anode active material.

Sample 71

In sample 71, a battery was manufactured in the same manner as that of Sample 1 except that two kinds of hard carbon spherically pulverized (referred to hereinafter as spherical hard carbon), having different particle sizes shown in Table 7, were used as the anode active material.

Sample 72

In Sample 72, a battery was manufactured in the same manner as that of Sample 1 except that two kinds of spherical natural graphite having different particle sizes shown in Table 7 were used as the anode active material.

Sample 73

In Sample 73, a battery was manufactured in the same manner as that of Sample 1 except that two kinds of spherical bulk artificial graphite having different particle sizes shown in Table 7 were used as the anode active material.

Sample 74

In Sample 74, a battery was manufactured in the same manner as that of Sample 1 except that two kinds of spherical hard carbon having different particle sizes shown in Table 7 were used as the anode active material.

Then, for the batteries of Samples 69 to 74 manufactured as mentioned above, the volume density of the anode composite mixture layer, the initial charging and discharging efficiency, the initial discharging capacity, discharge load characteristics, and the discharging capacity maintaining/retention ratio after a 500 cycle were measured.

The evaluated results of the volume density of the anode composite mixture layer, the initial charging and discharging efficiency, the initial discharging capacity, the discharge load characteristics, and the discharging capacity maintaining/retention ratio after a 500 cycle in Samples 69 to 74 are shown in Table 8.

TABLE 7

| | Anode Active Material 1 | | | | |
|---|---|---|---|---|---|
| | | | | Particle Size Distribution | |
| | D50 (μm) | D10 (μm) | D90 (μm) | log(D50) − log(D10) | log(D90) − log(D50) |
| Sample 69 | 30 | 19.0 | 46.0 | 0.198 | 0.186 |
| Sample 70 | 30 | 19.4 | 44.6 | 0.189 | 0.172 |
| Sample 71 | 30 | 19.1 | 44.8 | 0.196 | 0.174 |
| Sample 72 | 30 | 17.2 | 46.6 | 0.242 | 0.191 |
| Sample 73 | 31 | 20.1 | 53.5 | 0.188 | 0.237 |
| Sample 74 | 30 | 19.3 | 45.5 | 0.192 | 0.181 |

| | Anode Active Material 2 | | | | | Mixing Ratio Anode Active Material 1/ Anode Active Material 2 |
|---|---|---|---|---|---|---|
| | | | | Particle Size Distribution | | |
| | D50 (μm) | D10 (μm) | D90 (μm) | log(D50) − log(D10) | log(D90) − log(D50) | |
| Sample 69 | 12 | 7.4 | 18.6 | 0.210 | 0.190 | 70/30 |
| Sample 70 | 12 | 7.6 | 18.2 | 0.198 | 0.181 | 70/30 |
| Sample 71 | 12 | 7.5 | 18.3 | 0.204 | 0.183 | 70/30 |
| Sample 72 | 8 | 3.8 | 12.8 | 0.323 | 0.204 | 70/30 |
| Sample 73 | 16 | 8.1 | 20.2 | 0.296 | 0.101 | 70/30 |
| Sample 74 | 3.3 | 1.0 | 8.9 | 0.519 | 0.431 | 70/30 |

In Table 7, 10% cumulative particle size from the side of a small particle size when the particle size distribution is measured by a laser diffraction method is designated by D10 like the above-described Sample 1. Then, 50% cumulative particle size from the side of a small particle size is designated by D50 and 90% cumulative particle size from the side of a small particle size is designated by D90. Further, a carbonaceous

TABLE 8

| | Volumetric Density of Anode Composite Mixture Layer (g/cm³) | Initial Charging/ Discharging Efficiency (%) | Initial Discharging Capacity (mAh) |
|---|---|---|---|
| Sample 69 | 1.75 | 84 | 858 |
| Sample 70 | 1.75 | 87 | 865 |
| Sample 71 | 1.05 | 84 | 830 |
| Sample 72 | 1.70 | 74 | 755 |
| Sample 73 | 1.70 | 71 | 701 |
| Sample 74 | 0.94 | 68 | 675 |

TABLE 8-continued

|  | Discharging Load Characteristics (%) | Capacity Maintaining/retention Ratio after 500 Cycle (%) |
|---|---|---|
| Sample 69 | 85 | 76 |
| Sample 70 | 91 | 83 |
| Sample 71 | 86 | 80 |
| Sample 72 | 77 | 68 |
| Sample 73 | 78 | 67 |
| Sample 74 | 78 | 66 |

In Samples 69 to 74, the initial discharging capacity was evaluated under the same conditions as those of the above-described Sample 1 and Samples having the initial discharging capacity of 830 mAh or higher were considered to be good products. The initial charging and discharging efficiency was evaluated under the same conditions as those of the above-described Sample 1 and Samples having the initial charging and discharging efficiency of 83% or higher were considered to be good products. The discharge load characteristics were evaluated under the same conditions as those of the above-described Sample 1 and Samples having the discharge load characteristics of 85% or higher were considered to be good products. The discharging capacity maintaining/retention ratio after a 500 cycle was evaluated under the same conditions as those of the above-described Sample 1 and Samples having the discharging capacity maintaining/retention ratio after a 500 cycle of 75% or higher were considered to be good products.

In Samples 69 and 70 shown in Table 7, particle distributions represented by the expressions of log(D50)–log(D10) and log(D90)–log(D50) in the carbonaceous material of a large particle size and the carbonaceous material of a small particle size have values not larger than 0.22, and the particle size distribution areas of two kinds of spherical carbonaceous materials are controlled to be narrow ranges. In Sample 72, the particle size distribution of the spherical natural graphite of a small particle size represented by the expression of log(D50)–log(D10) in the spherical natural graphite of a large particle size and the spherical natural graphite of a small particle size is larger than 0.22, and the particle size distribution areas of two kinds of the spherical natural graphite are widened. Further, in Sample 73, the particle size distribution of the spherical bulk artificial graphite of a large particle size represented by the expression of log(D90)–log(D50) in the spherical bulk artificial graphite of the large particle size, and the particle size distribution of the spherical bulk artificial graphite of a small particle size represented by the expression of log(D50)–log(D10) in the spherical bulk artificial graphite of a small particle size are larger than 0.22. The particle size distribution areas of two kinds of spherical bulk artificial graphite are widened.

Then, as apparent from the evaluated results shown in Table 8, in Sample 69 and Sample 70, the volume density of the anode composite mixture layer, the initial charging and discharging efficiency, the initial discharging capacity, the discharge load characteristics, and the discharging capacity maintaining/retention ratio after a 500 cycle are higher than those of Samples 72 and 73. As described above, it is recognized that the particle size distributions of the spherical carbonaceous materials having different average particle sizes controlled to be narrow like Samples 69 and 70 exhibit more excellent battery characteristics.

In Samples 72 and 73, the particle size distributions represented by the expressions of log(D50)–log(D10) and log(D90)–log(D50) in the carbonaceous material of a large particle size and the carbonaceous material of a small particle size have at least one value larger than 0.22 like the above-described Samples 45 to 62 and the particle size distribution areas are widened. Thus, clearances in the anode composite mixture layer produced by the contact of two or more of spherical carbonaceous materials are not efficiently filled with the carbonaceous material of a small particle size. Thus, it is difficult to improve the volume density of the anode composite mixture layer. Therefore, in Samples 72 and 73, battery characteristics, such as the capacity of the battery, are decreased.

On the other hand, in Samples 69 and 70, the particle size distributions represented by the expressions of log(D50)–log(D10) and log(D90)–log(D50) in the carbonaceous material of the large particle size and the carbonaceous material of the small particle size have values not larger than 0.22, and the particle size distribution areas of the spherical carbonaceous materials having different average particle sizes are controlled to be narrow. Accordingly, an operational effect by the carbonaceous material of a large particle size and an operational effect by the carbonaceous material of a small particle size can be obtained similarly to the above-described Sample 14. Therefore, in Samples 69 and 70, the volume density of the anode composite mixture layer is increased to increase the capacity of the battery. Thus, the volume density of the anode composite mixture layer is high, the initial charging and discharging efficiency and the initial discharging capacity can be increased, and an ionic resistance to the electrolyte of the anode side can be lowered to prevent the deterioration of the discharge load characteristics and cyclic characteristics.

In Sample 71, shown in Table 7, particle distributions represented by the expressions of log(D50)–log(D10) and log(D90)–log(D50) in the spherical hard carbon of a small particle size have values not larger than 0.3 and the particle size distribution area of the spherical hard carbon of a small particle size is controlled to be a narrow range. On the other hand, in Sample 74, the particle size distribution of the spherical hard carbon of a small particle size represented by the expression of log(D50)–log(D10) in the spherical hard carbon of a small particle size is larger than 0.3 and the particle size distribution area of the spherical hard carbon of a small particle size is widened.

Then, as apparent from the evaluated results shown in Table 8, in Sample 71, the volume density of the anode composite mixture layer, the initial charging and discharging efficiency, the initial discharging capacity, the discharge load characteristics, and the discharging capacity maintaining/retention ratio after a 500 cycle are higher than those of Sample 74.

In Sample 74, the particle size distributions represented by the expressions of log(D50)–log(D10) and log(D90)–log(D50) in the spherical hard carbon of a small particle size have values larger than 0.22 like the above-described Samples 45 to 62, and the particle size distribution areas are widened. Thus, clearances in the anode composite mixture layer, produced by the contact of two or more of spherical hard carbons, are hardly efficiently filled with the spherical hard carbons of a small particle size. Thus, it is difficult to improve the volume density of the anode composite mixture layer. Therefore, in Sample 74, battery characteristics such as the capacity of the battery are decreased.

On the other hand, in Sample 71, the particle size distributions represented by the expressions of log(D50)–log(D10) and log(D90)–log(D50) in the spherical hard carbon of a large particle size and the spherical hard carbon of a small particle size have values not larger than 0.3, and the particle size distribution areas of two kinds of spherical hard carbons are controlled to be narrow. Accordingly, an operational effect by the spherical hard carbon of a large particle size and an operational effect by the spherical hard carbon of a small particle size can be obtained similarly to the above-described Sample 14. Therefore, in Sample 71, the volume density of the anode composite mixture layer is increased to increase the capacity of the battery. Thus, the volume density of the anode composite mixture layer is high, the initial charging and discharging efficiency and the initial discharging capacity can be increased, and an ionic resistance to the electrolyte of the anode side can be lowered to prevent the deterioration of the discharge load characteristics and cyclic characteristics.

As described above, the battery is manufactured by changing the anode active material from the spherical graphite to the spherical carbonaceous material. At this time, it is extremely effective to control the particle size distribution areas of the spherical carbonaceous materials having different average particle sizes to be narrow in manufacturing a battery having a high volume density of an anode composite mixture layer and excellent in its battery characteristics such as charging and discharging efficiency characteristics, discharging capacity characteristics, discharge load characteristics, and charging and discharging cyclic characteristics.

The present invention is not limited the above-described embodiments and it is obviously possible for a person with ordinary skill in the art to perform various changes, substitutions or the equivalence thereto without departing attached claims and the gist thereof.

INDUSTRIAL APPLICABILITY

As mentioned above, according to the present invention, the anode active material is composed of a mixture of a plurality of kinds of carbonaceous materials having different average particle sizes. The particle size distribution areas of the plural kinds of carbonaceous materials are controlled to be narrow. Thus, the carbonaceous material of a large particle size of the carbonaceous materials having different average particle sizes in the anode active material decreases a surface area to a volume, so that a reactivity with a non-aqueous electrolyte can be decreased to suppress the deterioration of the capacity of a battery. Further, according to the present invention, the carbonaceous material of the large particle size increases the volume relative to the surface area, so that a bulk part whose crystallization is advanced becomes large relative to the carbonaceous material of a small particle size. Thus, the amount of lithium storage is increased to increase the capacity of the battery or energy density. Further, according to the present invention, the carbonaceous material of a large particle size forms clearances of suitable sizes in the anode to retain a non-aqueous electrolyte. Thus, an ionic resistance to the non-aqueous electrolyte of the anode side can be lowered to prevent the deterioration of battery characteristics.

According to the present invention, the clearances in the anode are efficiently filled with the carbonaceous material of a small particle size having a large surface area relative to the volume of the anode among the carbonaceous materials having different average particle sizes in the anode active material while the carbonaceous material of a small particle size leaves spaces capable of retaining a suitable amount of non-aqueous electrolyte. Consequently the volume density of the anode can be improved to increase the capacity of the battery or energy density.

Therefore, according to the present invention, the non-aqueous electrolyte battery in which the energy density can be increased without deteriorating the battery characteristics is obtained.

The invention claimed is:

1. A non-aqueous electrolyte battery comprising:
    a cathode having a cathode active material containing lithium;
    an anode having an anode active material capable of being doped with/dedoped from lithium; and
    a non-aqueous electrolyte including electrolyte salt, wherein the anode active material is composed of a mixture of a plurality of spherical carbonaceous materials having a particle size distribution satisfying the relationship represented by expressions (1) and (2) below:

$$\log(D50)-\log(D10) \leq 0.3 \tag{1}$$

$$\log(D90)-\log(D50) \leq 0.3 \tag{2}$$

wherein the units of D are in units of μm and the logarithms have bases of 10; and
    wherein D10, D50, and D90 represent particle sizes of the mixture of the plurality of spherical carbonaceous materials, and where
        D10 represents a particle size such that 10% of the particles in the mixture of the plurality of spherical carbonaceous materials are smaller than D10,
        D50 represents a particle size such that 50% of the particles in the mixture of the plurality of spherical carbonaceous materials are smaller than D50, and
        D90 represents a particle size such that 90% of the particles in the mixture of the plurality of spherical carbonaceous materials are smaller than D90.

2. The non-aqueous electrolyte battery according to claim 1, wherein, the anode active material has a particle size distribution satisfying the relationship represented by expressions (3) and (4) below:

$$\log(DL50)-\log(DL10) \leq 0.22 \tag{3}$$

$$\log(DL90)-\log(DL50) \leq 0.22 \tag{4}$$

wherein the units of DL are in units of μm and the logarithms have bases of 10; and
    wherein DL10, DL50, and DL90 represent particle sizes of the graphite of large particle size, and where
        DL10 represents a particle size such that 10% of the particles of graphite of large particle size are smaller than DL10,
        DL50 represents a particle size such that 50% of the particles of graphite of large particle size are smaller than DL50, and
        DL90 represents a particle size such that 90% of the particles of graphite of large particle size are smaller than DL90; and
    the anode active material has a particle size distribution satisfying the relationship represented by expressions (5) and (6) below:

$$\log(DS50)-\log(DS10) \leq 0.22 \tag{5}$$

$$\log(DS90)-\log(DS50) \leq 0.22 \tag{6}$$

wherein the units of DS are in units of μm and the logarithms have bases of 10; and
    wherein DS10, DS50, and DS90 represent particle sizes of the graphite of small particle size, and where DS10 represents a particle size such that 10% of the particles of graphite of small particle size are smaller than DS10, DS50 represents a particle size such that 50% of the particles of graphite of small particle size are smaller than DS50, and DS90 represents a particle size such that 90% of the particles of graphite of small particle size are smaller than DS90.

3. The non-aqueous electrolyte battery according to claim 1, wherein, the anode active material is composed of a mixture at least including spherical graphite of large particle size whose average particle size is located within a range of 20 μm or larger and 40 μm or smaller and spherical graphite of small particle size whose average particle size is located within a range of 5 μm or larger and 16 μm or smaller, and the average particle size of the spherical graphite of small particle size is 0.55 times the average particle size of the spherical graphite of large particle size, or smaller.

* * * * *